(12) United States Patent
Nanbu et al.

(10) Patent No.: US 11,844,436 B2
(45) Date of Patent: Dec. 19, 2023

(54) SKIN MATERIAL FASTENING CLIP

(71) Applicant: YKK Corporation, Tokyo (JP)

(72) Inventors: Madoka Nanbu, Kurobe (JP); Wanli Zhang, Kurobe (JP); Kenji Dono, Macon, GA (US); Seiichiro Yonezawa, Kurobe (JP); Genta Matsumura, Tokyo (JP); Tetsuya Yoshino, Novi, MI (US); Tsutomu Yamada, Novi, MI (US)

(73) Assignee: YKK Corporation, Tokyo (JP)

( * ) Notice: Subject to any disclaimer, the term of this patent is extended or adjusted under 35 U.S.C. 154(b) by 579 days.

(21) Appl. No.: 17/050,432

(22) PCT Filed: Dec. 13, 2019

(86) PCT No.: PCT/JP2019/048945
§ 371 (c)(1),
(2) Date: Oct. 24, 2020

(87) PCT Pub. No.: WO2020/137624
PCT Pub. Date: Jul. 2, 2020

(65) Prior Publication Data
US 2021/0137279 A1 May 13, 2021

(30) Foreign Application Priority Data

Dec. 26, 2018 (JP) ................. 2018-243102
Apr. 1, 2019 (JP) ................. 2019-070093

(51) Int. Cl.
*A47C 31/02* (2006.01)
*B60N 2/58* (2006.01)
(Continued)

(52) U.S. Cl.
CPC .......... *A47C 31/023* (2013.01); *B60N 2/5825* (2013.01); *B60N 2/6027* (2013.01); *B68G 7/052* (2013.01)

(58) Field of Classification Search
CPC .................................................. A47C 31/023
See application file for complete search history.

(56) References Cited

U.S. PATENT DOCUMENTS 9,517,926 B2 * 12/2016 Murasaki ................. B68G 7/12
9,663,007 B2 *  5/2017 Murasaki ............. A47C 31/023
(Continued)

FOREIGN PATENT DOCUMENTS

CN          101031224 A          9/2007
CN          103068719 A          4/2013
(Continued)

OTHER PUBLICATIONS

Office Action, Chinese Patent Application No. 201980027007.3, dated Aug. 3, 2022, 7 pages.
(Continued)

*Primary Examiner* — Robert Sandy
(74) *Attorney, Agent, or Firm* — Kilpatrick Townsend & Stockton LLP

(57) ABSTRACT

A cover-material fixing clip includes: a chuck having a base portion, a first holding piece and a second holding piece; a hook configured to be engaged with a wire to be located in a groove of a cushion material; and an engagement opening defined between the chuck and a leading end of the hook. The base portion, the first holding piece and the second holding piece define a retention groove for holding the held body attached to the cover material. The engagement opening has an opening dimension in a range from 50% to 80% of a width of the retention groove.

7 Claims, 20 Drawing Sheets

(51) Int. Cl.
  *B60N 2/60* (2006.01)
  *B68G 7/052* (2006.01)

(56) References Cited

U.S. PATENT DOCUMENTS

| | | | |
|---|---|---|---|
| 9,827,890 B2* | 11/2017 | Saiga | ............... B68G 7/12 |
| 10,993,547 B2* | 5/2021 | Zhang | ............... B68G 7/052 |
| 2003/0215601 A1 | 11/2003 | Pedde et al. | |
| 2018/0162719 A1 | 6/2018 | Matsumura et al. | |
| 2018/0236915 A1 | 8/2018 | Agonia et al. | |

FOREIGN PATENT DOCUMENTS

| | | |
|---|---|---|
| CN | 105686472 A | 6/2016 |
| CN | 105705066 A | 6/2016 |
| CN | 108883925 A | 11/2018 |
| CN | 109068865 A | 12/2018 |
| JP | 2007-275557 A | 10/2007 |
| JP | 2011-45424 A | 3/2011 |
| JP | 2011-177413 A | 9/2011 |
| JP | 2012-217759 A | 11/2012 |
| JP | 2016-106979 A | 6/2016 |
| JP | 6020320 B2 | 11/2016 |
| KR | 10-2017-0132858 A | 12/2017 |
| WO | 2016/178275 A1 | 11/2016 |

OTHER PUBLICATIONS

International Search Report, PCT Patent Application No. PCT/JP2019/048945, dated Jan. 28, 2020.
Office Action, Japanese Patent Application No. 2020-563083, dated Mar. 15, 2022, 8 pages.
Office Action, South Korean Patent Application No. 10-2020-7030540, dated Mar. 17, 2022, 12 pages.
Office Action, Chinese Patent Application No. 201980027007.3, dated Nov. 2, 2021, 20 pages.
International Preliminary Report on Patentability, PCT Patent Application No. PCT/JP2019/048945, dated Jun. 16, 2021, 8 pages.

* cited by examiner

SKIN MATERIAL FASTENING CLIP

TECHNICAL FIELD

The present invention relates to a cover-material fixing clip and a cover-material fixing structure used for fixing a cover material that covers a surface of a car seat, a chair used in a room, and the like.

BACKGROUND ART

Typically, in the above-described seat, chair and the like, a cushion material or a soft pad whose surface is covered with a cover material is frequently used at a portion to be touched by a human body (e.g., a seat surface and a back rest). Various structures are employed for fixing such a cover material.

For instance, there has been known a cover-material fixing structure including a linear body (wire) disposed in a groove of a cushion pad main body (cushion material), a clip engaged with the cover-material fixing structure, and a lock attached to a rear side of the cover material and engaged with the clip, thereby fixing the cover material from the rear side (see Patent Literatures 1 to 3).

Patent Literature 1 discloses a clip including a base, elastically deformable right and left first extension pieces that extend from a first side of the base, and elastically deformable hook-shaped second extension piece that extends from a second side of the base in an opposite direction from the extension direction of the right and left first extension pieces. In this clip, the wire is engaged with the second extension pieces and a lock is engaged with the right and left first extension pieces, whereby the cover material is fixed to the wire.

Patent Literature 2 discloses a clip including a locking claw base (base), an elastically deformable pair of locking claws that extend from a first side of the locking claw base, and a hook that extends from a second side of the locking claw base opposite the first side in a direction opposite the pair of locking claws. In this clip, a locking terminal member (locking tool) attached to the cover material is engaged with the pair of locking claws and the hook is engaged with the wire to fix the cover material to the wire.

Patent Literature 3 discloses a clip including: a chuck defined by a bottom and a pair of right and left holding pieces extending from the bottom; a hook piece extending from the chuck; and a guide piece extending from the chuck toward an opening of the hook to face the hook. In this clip, a suspender (locking tool) provided to a suspended fabric (cover material) is engaged with the pair of right and left holding pieces and the guide piece is pushed against the wire to engage the wire with the hook piece, thereby fixing the suspended fabric.

CITATION LIST

Patent Literature(s)

Patent Literature 1 JP 2011-45424 A
Patent Literature 2 International Publication WO 2016/178275
Patent Literature 3 JP 6020320 B

SUMMARY OF THE INVENTION

Problems to be Solved by the Invention

The clips of Patent Literatures 1 to 3, whose entire width and the like are designed depending on a width in a right-and-left direction of the locking tool attached to the cover material, is configured to be engaged with a wire having a diameter of 20% to 35% of the width of the locking tool attached to the cover material (or a width of a holding groove in which the locking tool of the clip is locked). Accordingly, when a larger diameter of the wire than a typical diameter is demanded in order to improve the strength of the wire, the above clips cannot be suitably engaged with the large-diameter wire. For a wire having such a diameter that the clip is not engageable, the cover material is connected to a cushion pad body with a metallic ring instead of the clip, which results in poor workability in the connection process.

An object of the invention is to provide a cover-material fixing clip and a cover-material fixing structure which are capable of meeting a demand of increasing a diameter of a wire.

Means for Solving the Problems

According to an aspect of the invention, a cover-material fixing clip includes: a chuck provided with a retention groove for holding a held body attached to a cover material; a hook configured to be engaged with a wire to be located in a groove of a cushion material; and an engagement opening defined between the chuck and a leading end of the hook, the engagement opening having an opening dimension in a range from 50% to 80% of a width of the retention groove.

The cover-material fixing clip in the above aspect of the invention can meet a demand of increasing the diameter of the wire.

In the cover-material fixing clip according to the above aspect, the chuck includes: a base portion; a first holding piece and a second holding piece extending from the base portion in a first direction; and a locking projection projecting toward the leading end of the hook, the first holding piece and the second holding piece respectively include claws projecting to approach each other in a second direction intersecting with the first direction, the hook includes a base end continuous to the second holding piece of the chuck, the locking projection is continuous to the first holding piece of the chuck, and provided that a dimension of each of the claws in the second direction is a dimension L1, a dimension from each of the claws to the base portion in the first direction is a dimension L2, a dimension of the base portion and the locking projection in combination in the first direction is a dimension L3, and a dimension of a space between the wire (20) being engaged with the hook and the locking projection is a dimension L4, the dimension L1, the dimension L2 and the dimension L3 are set so that a dimension obtained by dividing the dimension L2 with the dimension L3 and multiplying the obtained value with the dimension L1 is set to be larger than the dimension L4.

The dimensions L1 to L3 of the cover-material fixing clip in the above aspect of the invention are set as described above. Accordingly, in the cover-material fixing clip in the above aspect of the invention, for instance, when the held body attached to the cover material is held by the chuck and the wire whose diameter is larger than a dimension of an engagement opening between the hook and the locking projection is engaged with the hook, a force for drawing from the chuck is applied to the held body to widen a space between the holding pieces outward in the second direction, thereby generating a force for moving the locking projection toward the wire, so that the locking projection prevents the wire from dropping off. Meanwhile, since the locking projection is in contact with the wire, the holding pieces are prevented from moving outward in the second direction, so that a force of holding the held body in the chuck can be maintained.

In the cover-material fixing clip according to the above aspect, a thickness of the base portion may be smaller than a thickness at a base end of each of the first holding piece and the second holding piece.

This arrangement elastically deforms the base portion having the small thickness when inserting the held body between the first holding piece and the second holding piece, so that the held body can be easily inserted. Moreover, in the state where the wire is engaged with the hook, even if the held body is attempted to be drawn from between the first holding piece and the second holding piece, the locking projection in pressure contact with the wire can prevent the first holding piece from being moved outward.

In the cover-material fixing clip according to the above aspect, the base end of the hook may be spaced from the locking projection in the second direction, and the base portion may include a concave portion that is recessed toward the chuck at a part of the base portion between the base end of the hook and the locking projection.

With this arrangement, due to a small thickness of the part of the base portion where the concave portion is formed is small, the part is easily elastically deformed, and eventually the elastic deformation of the part allows the held body to be easily inserted between the pair of holding pieces and allows the force for moving the locking projection toward the wire to be generated.

In the cover-material fixing clip according to the above aspect, the thickness at the base end of each of the first holding piece and the second holding piece may be larger than the thickness of the base portion.

With this arrangement, the base portion is more easily elastically deformable than the base end of each of the first holding piece and the second holding piece. Accordingly, the strength of the holding pieces is improved to increase the holding force for the held body and the base portion is elastically deformed when the held body is attempted to be drawn from the chuck, so that the locking projection generates the moving force toward the wire to prevent the wire from dropping off.

In the cover-material fixing clip according to the above aspect, a thickness of each of the first holding piece and the second holding piece may be larger in an at least half region from the base end in the first direction of the cover material than in a region close to a leading end with respect to the at least half region.

With this arrangement, the first holding piece and the second holding piece can provide an improved strength in a region close to the base end while still having elasticity in a region close to the leading end, the elasticity enough for the held body to be insertable between the first holding piece and the second holding piece. Accordingly, the holding force of the chuck for the held body is improvable while the held body is insertable between the first holding piece and the second holding piece.

In the cover-material fixing clip according to the above aspect, the thickness of each of the first holding piece and the second holding piece may be gradually decreased from the base end toward the leading end.

With this arrangement, the first holding piece and the second holding piece can provide an improved strength in the region close to the base end while still having elasticity in the region close to the leading end, the elasticity enough for the held body to be insertable between the first holding piece and the second holding piece. Further, the first holding piece and the second holding piece can be prevented from being locally elastically deformed.

In the cover-material fixing clip according to the above aspect, the chuck includes: a base portion; and a first holding piece and a second holding piece extending from the base portion in a first direction and facing each other in a second direction intersecting with the first direction, the hook is continuous to the second holding piece of the chuck and includes a groove formation surface defining an engagement groove where the wire is received, the chuck further includes: an outer side surface at the first holding piece; and a wire-receiving surface continuous to the outer side surface and the groove formation surface, and the leading end of the hook is arranged close to the second holding piece with respect to the outer side surface at the first holding piece of the chuck.

According to the cover-material fixing clip according to the above aspect of the invention, since the engagement opening into which the wire is inserted is defined between the wire-receiving surface and the leading end of the hook, the wire is to be inserted into the engagement opening while the entire cover-material fixing clip is slanted with respect to the insertion direction in which the cover-material fixing clip is inserted into the groove of the cushion material. In the above aspect, since the leading end of the hook is located close to the second holding piece with respect to the outer side surface of the first holding piece of the chuck, the cover-material fixing clip can receive the wire on the wire-receiving surface of the chuck without being significantly slanted with respect to the insertion direction, whereby the wire can be smoothly inserted into the engagement opening between the leading end of the hook and the wire-receiving surface, and can be easily engaged with the hook.

Herein, even when the wire whose diameter is larger than a dimension of a space between the leading end of the hook and the wire-receiving surface is engaged with the hook, since the wire can be received on the wire-receiving surface as described above, the wire can be brought into contact with the leading end of the hook and the wire-receiving surface to be easily inserted into the engagement opening.

According to the cover-material fixing clip according to the above aspect of the invention, the hook includes a guide surface continuous to the leading end, and the guide surface is slanted from a side close to the second holding piece to a side close to the first holding piece with respect to the second direction so as to approach the wire-receiving surface.

With this arrangement, since the guide surface continuous to the leading end of the hook is slanted as described above, by inserting the cover-material fixing clip into the groove of the cushion material and sliding the cover-material fixing clip with the guide surface kept in contact with the wire, the wire can be guided toward the engagement opening while the cover-material fixing clip is slanted.

In the cover-material fixing clip according to the above aspect, the hook may be continuous to the second holding piece.

With this arrangement, since the hook is continuous to the second holding piece, the engagement groove, which is formed by the groove formation surface continuous to the wire-receiving surface of the chuck, is made large, which allows the wire having a larger diameter to be engaged with the hook.

Moreover, the leading end of the hook can be located closer to the second holding piece while the engagement groove in a predetermined size is formed, so that an angle for slanting the cover-material fixing clip with respect to the insertion direction in order to engage the hook with wire can be made smaller.

In the cover-material fixing clip according to the above aspect, an end of the guide surface may be located close to the second holding piece with respect to an imaginary line along the first direction passing through a middle of the first holding piece and the second holding piece in the second direction.

With this arrangement, for instance, compared with a case where the end of the hook is close to the first holding piece with respect to the imaginary line, the guide surface can be formed longer in a slant direction thereof. Accordingly, even when the cover-material fixing clip is misaligned in the right-and-left direction orthogonal to the insertion direction in which the cover-material fixing clip is inserted into the groove of the cushion material, the guide surface can be brought into contact with the wire in a wide range.

In the cover-material fixing clip according to the above aspect, at least one part of the wire-receiving surface, which is located close to the first holding piece with respect to the leading end of the hook in the second direction, may be slanted from a side on the first holding piece to a side on the second holding piece with respect to the second direction so as to approach the leading end of the hook.

With this arrangement, for instance, compared with a case where the part of the wire-receiving surface is formed along the second direction, a plane region where the cover-material fixing clip is projected on the wire when the cover-material fixing clip is slanted with respect to the insertion direction can be made wide, so that the wire can be stably received on this plane region.

In the cover-material fixing clip according to the above aspect, the chuck may include: a base portion; and a first holding piece and a second holding piece extending from the base portion in a first direction and facing each other in a second direction intersecting with the first direction, at least one of the leading end of the hook or the chuck includes a narrow projection projecting toward a facing one of the leading end and the chuck and defining the engagement opening, and a width of the narrow projection in a third direction intersecting with the first direction and the second direction may be smaller than a width of at least one of the hook or the chuck in the third direction.

With this arrangement, the engagement opening is defined by the narrow projection, which is formed on at least one of the leading end of the hook or the chuck, and the other one of the leading end and the chuck, or the narrow projection formed on both the leading end and the chuck. Accordingly, when the wire is inserted into the engagement opening, a contact area of the clip to be contacted with the wire is reducible, thereby improving the wire-insertion capability.

In the cover-material fixing clip according to the above aspect, a taper surface tapering the hook to the leading end may be formed at a part close to the leading end of each of opposite sides of the hook.

With this arrangement, since both the taper surfaces taper the leading end of the hook, an insertion force of the wire into the engagement opening is reducible.

In the cover-material fixing clip according to the above aspect, the narrow projection may be formed at the leading end of the hook, and a width of the narrow projection in the third direction may be in a range from 18% to 70% of a maximum width of the hook in the third direction.

With this arrangement, the above-described wire-insertion capability is improvable and the wire is suitably preventable from dropping off.

In the cover-material fixing clip according to the above aspect, the narrow projection may include an end guide face that is slanted toward an outside of the engagement opening so as to be away from the chuck.

With this arrangement, the wire immediately before being inserted into the engagement opening can be guided into the engagement opening through the end guide face, so that the wire-insertion capability is improvable.

A cover-material fixing structure includes a held body to be attached to a cover material; a wire to be located in a groove of a cushion material; and the cover-material fixing clip according to the above aspect to hold the held body and be engaged with the wire.

The cover-material fixing structure according to the above aspect of the invention can exhibit the above-described operations and effects of the cover-material fixing clip.

According to the above aspects of the invention, a cover-material fixing clip and a cover-material fixing structure which are capable of meeting a demand of increasing a diameter of a wire can be provided.

DESCRIPTION OF EXEMPLARY
EMBODIMENT(S)

First Exemplary Embodiment

A first exemplary embodiment of the invention will be described below with reference to the attached drawings.

Figure 1:
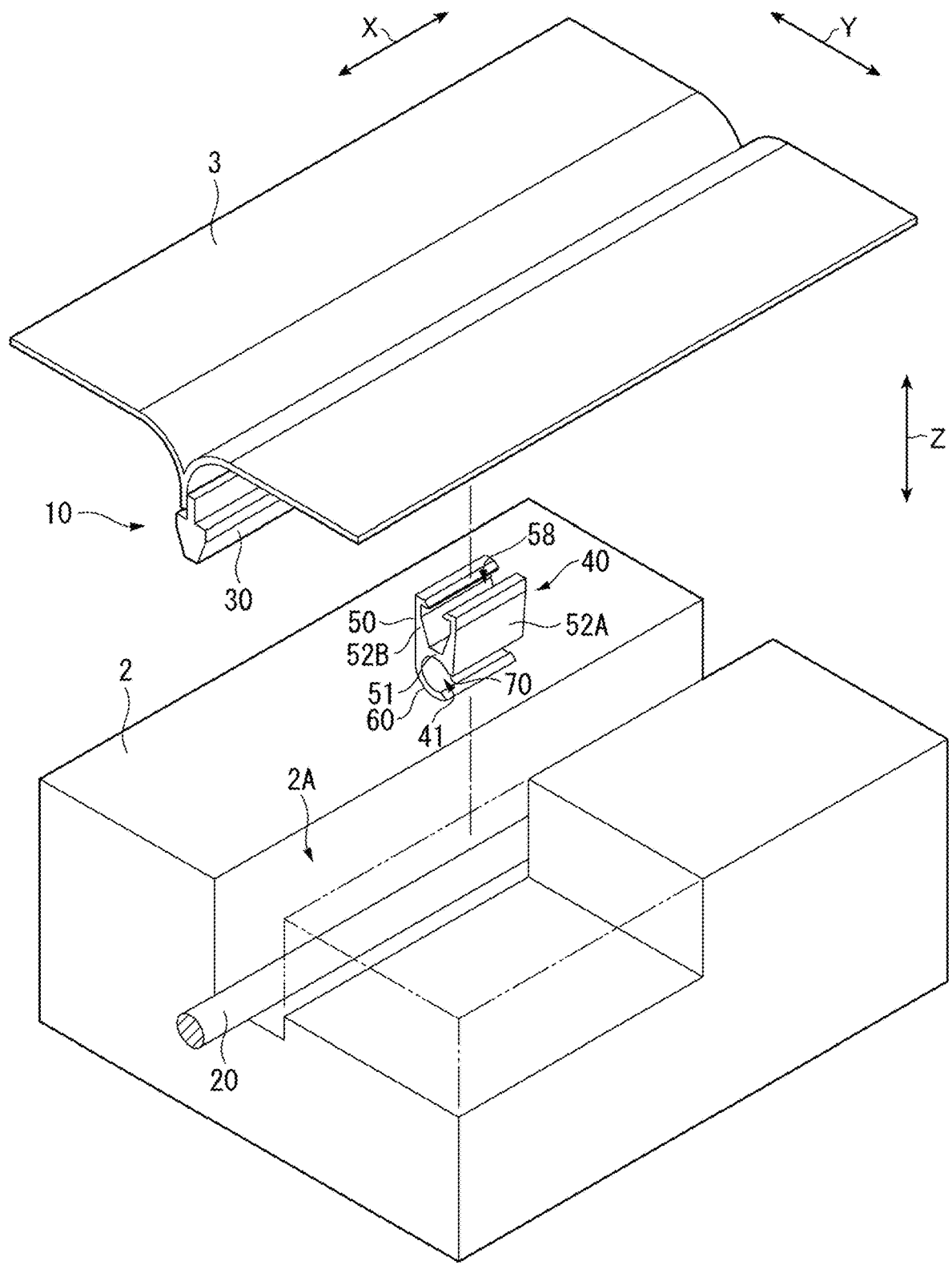
FIG. 1 is an exploded perspective view of a cover-material fixing structure according to a first exemplary embodiment of the invention.

As shown in FIG. 1, a cover-material fixing structure 10 according to the first exemplary embodiment is for fixing a cover material 3 covering a surface of a cushion material 2 of a seat in a vehicle such as an automobile. The cover-material fixing structure 10 includes: a cross-sectionally circular wire 20 (linear body) disposed in a groove 2A formed in the cushion material 2; a held body 30 attached to a rear surface of the cover material 3; and a cover-material fixing clip 40 (hereinafter, referred to as the "clip") configured to be engaged with the wire 20 and hold the held body 30.

In the following description, a length direction of the clip 40 (third direction (the same direction as a length direction of the held body 30)) is defined as an X-axis direction, a right-and-left direction (second direction) of the clip 40 is defined as a Y-axis direction, and a vertical direction (first direction) of the clip 40 is defined as a Z-axis direction. The X, Y and Z-axis directions are orthogonal to each other.

The cushion material 2 is a synthetic resin urethane foam material (e.g., foamed polyurethane) molded into a shape of a seat. In the exemplary embodiment, a diameter of the wire 20 is defined in a range from 60% to 100% of a width of the held body 30 in the Y-axis direction (or a width W3 of a retention groove 59 for holding the held body 30 of the clip 40 in the Y-axis direction). The cover material 3 is made of a synthetic resin fabric sheet or the like.

Figure 2:
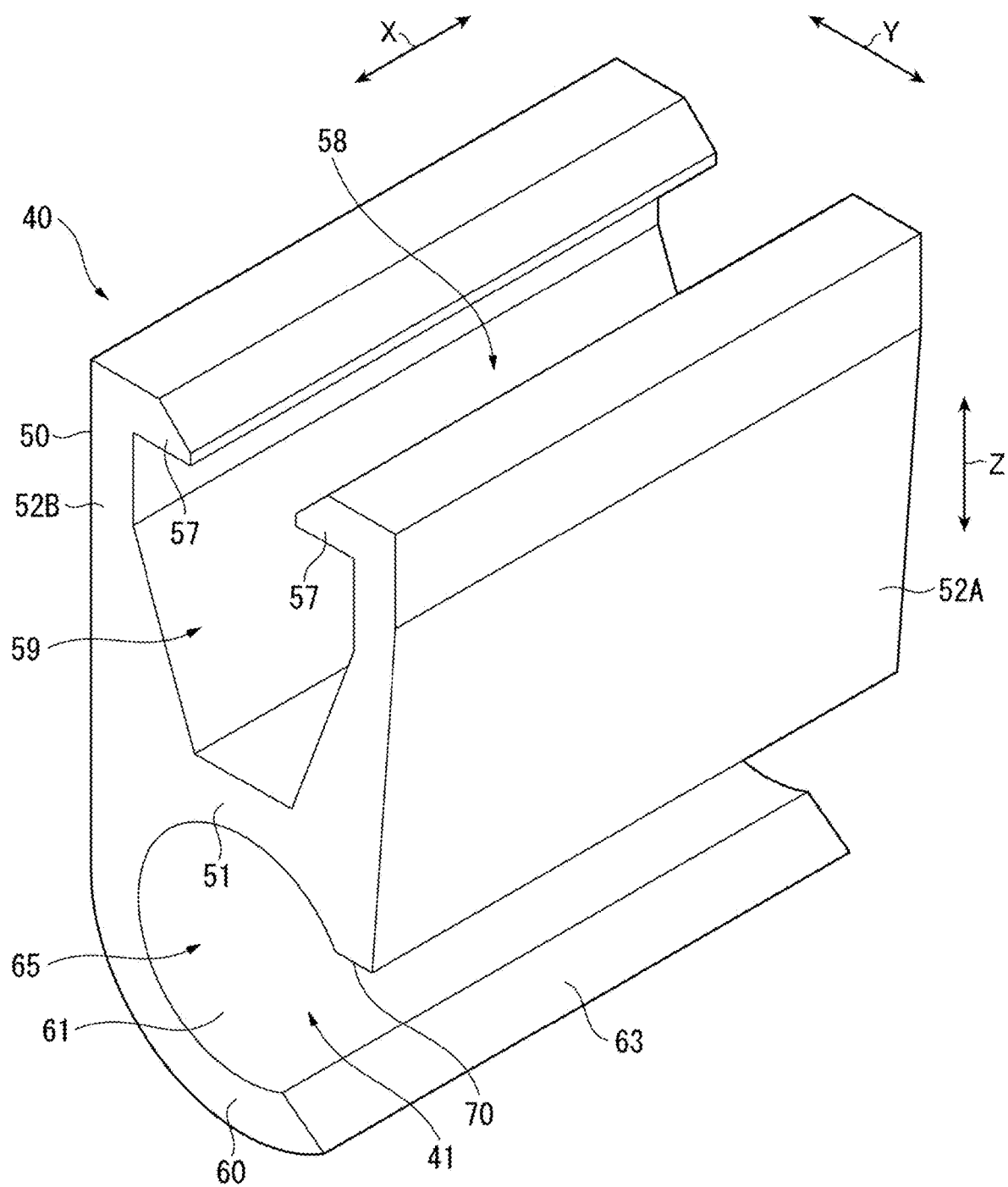
FIG. 2 is a perspective view of a clip in the cover-material fixing structure according to the first exemplary embodiment.
Figure 3:
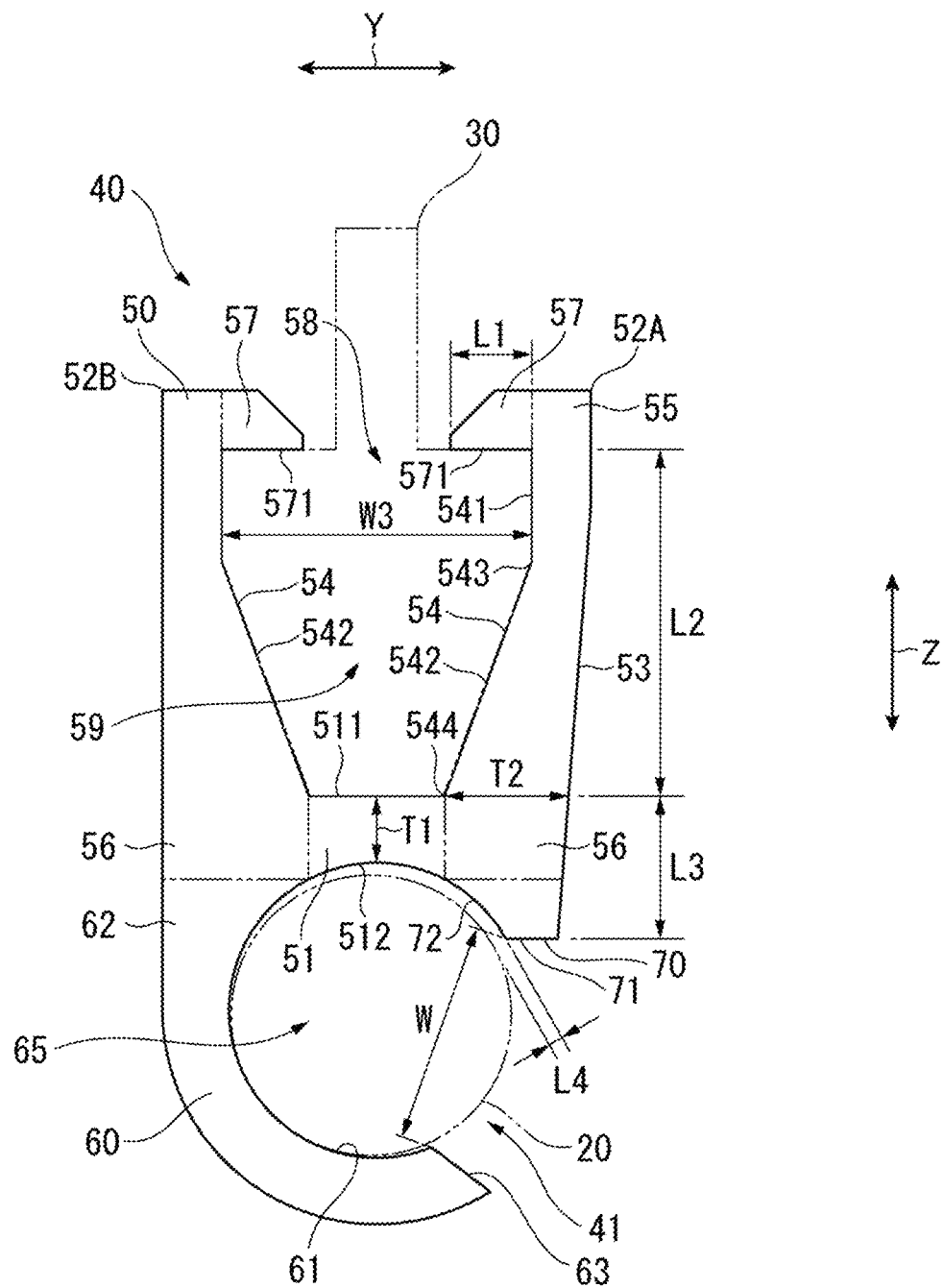
FIG. 3 is an end view of the clip in the cover-material fixing structure according to the first exemplary embodiment.

As shown in FIGS. 2 and 3, the clip 40 includes: a chuck 50 configured to hold the held body 30; an elastically deformable hook 60 configured to be engaged with the wire 20; and a locking projection 70 defining an engagement opening 41 with a leading end 63 of the hook 60, the engagement opening 41 having an opening dimension W. The opening dimension W (minimum opening dimension) of the engagement opening 41 is set in a range from 50% to 80% of the width W3 (maximum width) of the retention groove 59 in the Y-axis direction (65% in the exemplary embodiment).

The chuck 50 includes: a base portion 51; and a first holding piece 52A and a second holding piece 52B, which are elastically deformable, extending from the base portion 51 upward in the Z-axis direction and facing each other with a space therebetween in the Y-axis direction.

The base portion 51 has a bottom 511 continuous to an inner side surface 54 (later described) of each of the first holding piece 52A and the second holding piece 52B, and an arc surface 512 continuous to a groove formation surface 61 (later described) of the hook 60. A central position of the base portion 51 in the Y-axis direction is set at a thickness T1 (thickness in the Z-axis direction). The thickness T1 is defined to be smaller than a thickness T2 in the Y-axis direction at the base end 56 of the first holding piece 52A. A dimension of the base end 56 in the Y-axis direction is also defined to be the thickness T2.

The first holding piece 52A and the second holding piece 52B are continuous to respective sides of the base portion 51 in the Y-axis direction. The first holding piece 52A has an outer side surface 53 and an inner side surface 54. The inner side surface 54 is provided with an inner surface 541 along the Z-axis direction and a slant inner surface 542 closer to the base portion 51 than the inner surface 541. An end 543 of the slant inner surface 542, which is located close to the leading end 55 of the first holding piece 52A, is continuous to the inner surface 541. An end 544 of the slant inner surface 542, which is located close to the base portion 51, is continuous to the later-described bottom 511 of the base portion 51. Moreover, the first holding piece 52A includes a claw 57 projecting from the leading end 55 toward the second holding piece 52B in the Y-axis direction and having an engagement inner surface 571 continuous to the inner surface 541.

The slant inner surface 542 is slanted with respect to the Z-axis direction so that the end 544 is located closer to the second holding piece 52B than the end 543. Accordingly, a thickness in the Y-axis direction of a portion of the first holding piece 52A, where the slant inner surface 542 is formed, is gradually decreased from the base end 56 toward the leading end 55 of the first holding piece 52A.

In the exemplary embodiment, the slant inner surface 542 is formed over at least half of a region (sometimes referred to as "at-least-half region" herein) of the first holding piece 52A along the Z-axis direction. Accordingly, a thickness of the first holding piece 52A in the at-least-half region from the base end 56 in the Z-axis direction is larger than a thickness of the first holding piece 52A in a region close to the leading end 55 with respect to the at-least-half region. The above-described thickness T2 of the first holding piece 52A, which is the maximum thickness at the base end 56 in the exemplary embodiment, is set at a dimension at least twice as large as the thickness T1 at the base portion 51.

Since the second holding piece 52B is configured in the same manner as the first holding piece 52A and is arranged opposite to the first holding piece 52A in a left-and-right direction, components of the second holding piece 52B are appropriately denoted by the same signs as those of the first holding piece 52A.

The claws 57 of the first holding piece 52A and the second holding piece 52B project so as to approach each other in the Y-axis direction and define a retention opening 58 between the claws 57 through which the held body 30 is inserted.

The bottom 511 of the base portion 51, the inner side surfaces 54 of the first holding piece 52A and the second holding piece 52B, and the engagement inner surfaces 571 of the claws 57 define the retention groove 59 in which the held body 30 is placed.

The hook 60 having the groove formation surface 61 is curved in the exemplary embodiment. A base end 62 of the hook 60 is continuous to the base end 56 of the second holding piece 52B while the leading end 63 of the hook 60 defines the engagement opening 41 with the locking projection 70.

The locking projection 70 is spaced in the Y-axis direction from the base end 62 of the hook 60. The locking projection 70 is continuous to the base end 56 of the first holding piece 52A while projecting in the Z-axis direction toward the leading end 63 of the hook 60 from the base end 56. The locking projection 70 includes: an end surface 71; and an arc surface 72 continuous to the end surface 71 and the arc surface 512 of the base portion 51.

In the hook 60, the engagement groove 65, where the wire 20 is to be placed, is formed by the groove formation surface 61 and the arc surfaces 72, 512. In the exemplary embodiment, a diameter of the engagement groove 65 is set to be slightly larger than a diameter of the wire 20.

The above clip 40 is designed to satisfy the following formula (1), where a dimension of the engagement inner surface 571 of the claw 57 in the Y-axis direction is a dimension L1, a dimension from the engagement inner surface 571 of the claw 57 in the X-axis direction to the bottom 511 of the base portion 51 is a dimension L2, a dimension of the base portion 51 and the locking projection 70 in combination in the Z-axis direction (i.e., a dimension from the bottom 511 of the base portion 51 to the end surface 71 of the locking projection 70 in the Z-axis direction) is a dimension L3, and a dimension of a space between a circumferential surface of the wire 20 being engaged with the hook 60 and the arc surface 72 of the locking projection 70 is a dimension L4. Specifically, the dimension L1, the dimension L2 and the dimension L3 are set so that a dimension obtained by dividing the dimension L2 with the dimension L3 and multiplying the obtained value with the dimension L1 is larger than the dimension L4.

Numerical Formula 1

$$L4 < \frac{L2}{L3} \times L1 \qquad (1)$$

Figure 4:
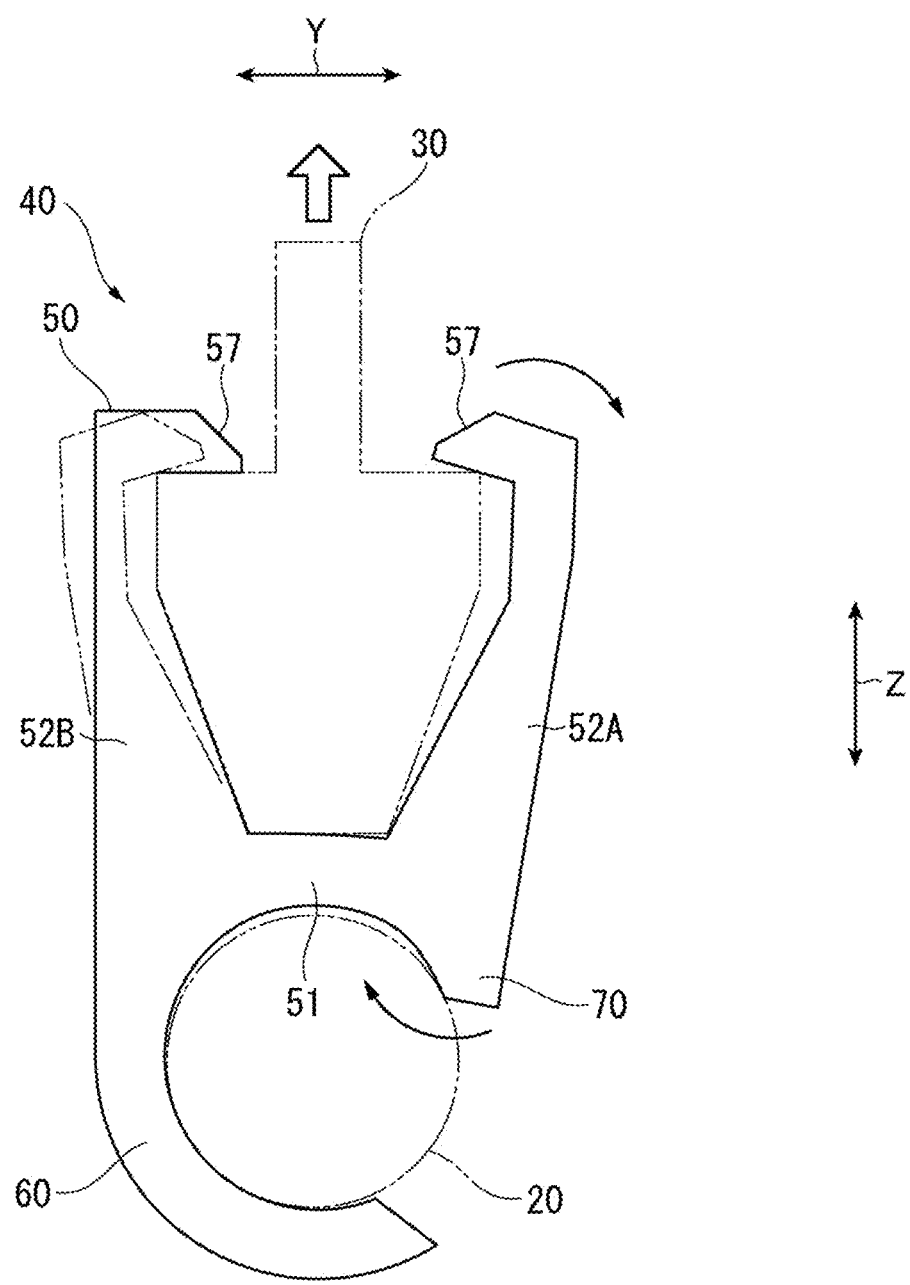
FIG. 4 is an end view of the clip in motion in the cover-material fixing structure according to the first exemplary embodiment.

Since the dimensions of the clip 40 are set as described above, for instance, when a drawing force in the Z-axis direction is applied to the held body 30 as shown in FIG. 4 and the first holding piece 52A and the second holding piece 52B are away from each other in the Y-axis direction to be opened while being elastically deformed, the locking projection 70 approaches the wire 20 to be brought into contact with the wire 20, thereby restraining the first holding piece 52A from moving outward. The held body 30 is thus restrained from being drawn. Simultaneously, the locking projection 70 is in contact with the circumferential surface of the wire 20, restraining the wire 20 from being drawn.

Installation Procedure in First Exemplary Embodiment

An installation procedure of the cover-material fixing structure 10 according to the first exemplary embodiment will be described below.

Firstly, the held body 30 attached with the cover material 3 is inserted into the retention opening 58 of the clip 40 to be placed in the retention groove 59 while being engaged with the engagement inner surface 571 of the claw 57 to be prevented from dropping off.

Figure 5:
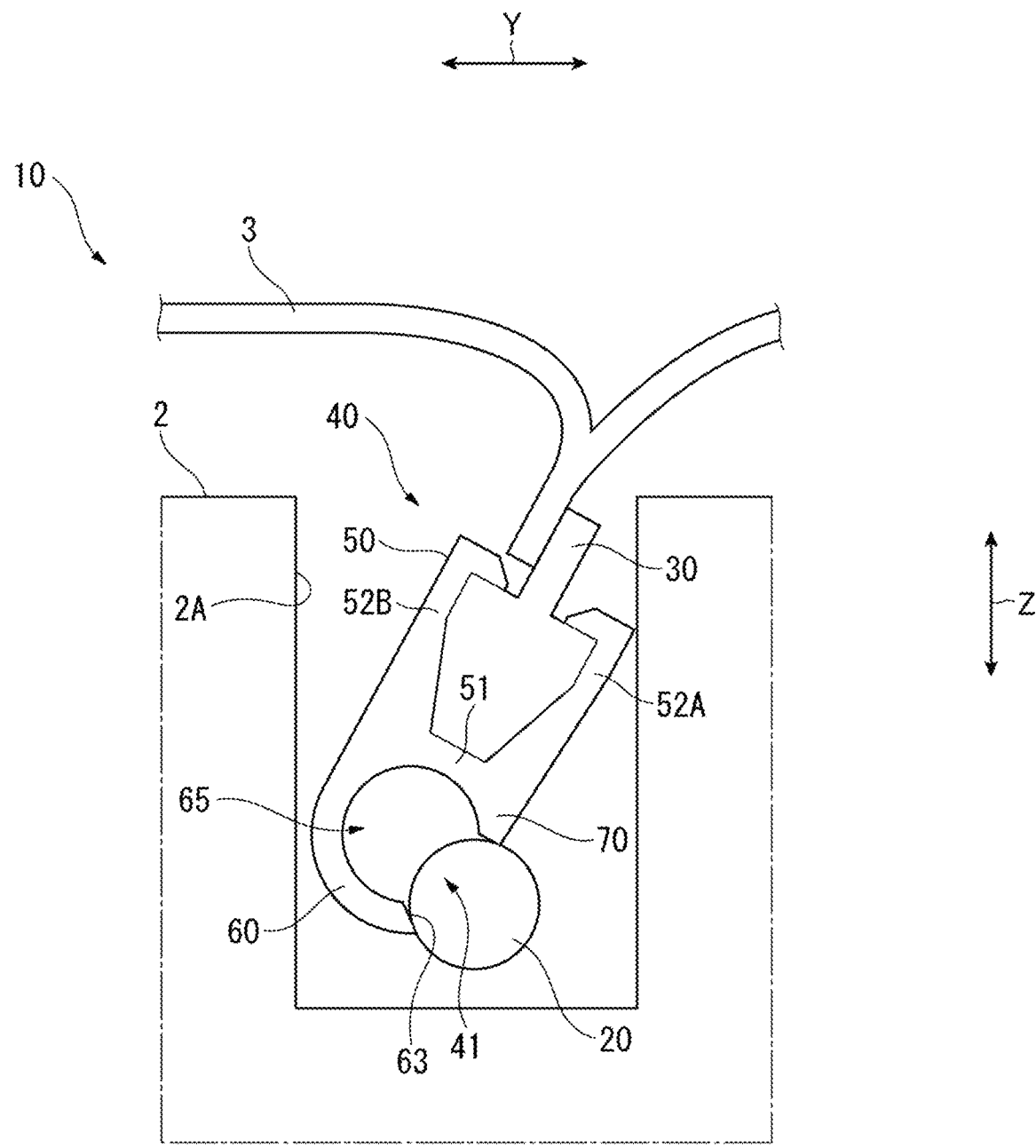
FIG. 5 explanatively shows an installation procedure of the cover-material fixing structure according to the first exemplary embodiment.
Figure 6:
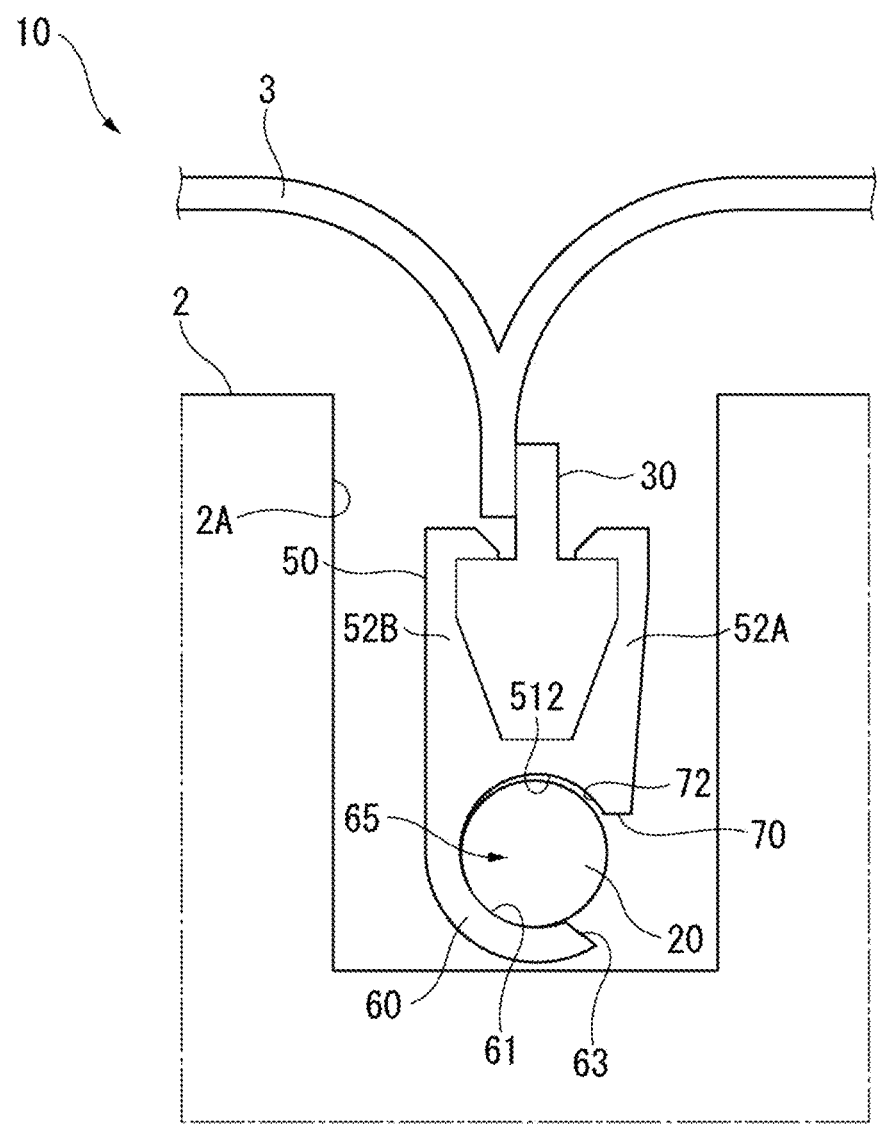
FIG. 6 explanatively shows how a cover material is fixed by in the cover-material fixing structure according to the first exemplary embodiment.

Next, the clip 40 is inserted in the Z-axis direction into the groove 2A of the cushion material 2 to be engaged with the wire 20. Specifically, the clip 40 will be engaged with the wire 20 as follows. Firstly, as shown in FIG. 5, the clip 40 is inserted into the groove 2A while being slanted with respect to the Z-axis direction (a clip insertion direction), and the leading end 63 of the hook 60 and the locking projection 70 are brought into contact with the circumferential surface of the wire 20. Subsequently, while the clip 40 is pressed against the wire 20 and the hook 60 is elastically deformed so as to widen the engagement opening 41, the wire 20 is pushed into the engagement groove 65 through the engagement opening 41 to be brought into a state shown in FIG. 6. In the state shown in FIG. 6, the wire 20 is surrounded by the groove formation surface 61 and the arc surfaces 72, 512, so that the wire 20 becomes engaged with the hook 60.

Advantages of First Exemplary Embodiment (1) In the first exemplary embodiment, the opening dimension W of the engagement opening 41 is set to be 50% to 80% of the width W3 of the retention groove 59. With this structure, a large-sized wire 20, whose diameter is, for instance, 60% to 100% of the width W3 of the retention groove 59, can be engaged.

Moreover, the opening dimension W set to be smaller than the diameter of the wire 20 provides a clicking feeling when the wire 20 is pushed into the engagement groove 65 and also prevents the disengagement of the wire 20 from the engagement groove 65.

(2) In the first exemplary embodiment, provided that the dimension of the claw 57 in the Y-axis direction is the dimension L1, the dimension from the claw 57 in the Z-axis direction to the base portion 51 is the dimension L2, the dimension of the base portion 51 and the locking projection 70 in combination in the Z-axis direction is the dimension L3, and the dimension of the space between the wire 20 being engaged with the hook 60 and the locking projection 70 is the dimension L4, the dimension L1, the dimension L2 and the dimension L3 are set so that the dimension obtained by dividing the dimension L2 with the dimension L3 and multiplying the obtained value with the dimension L1 is larger than the dimension L4.

Accordingly, a drawing force from the chuck 50 is applied to the held body 30 to press the first holding piece 52A outward in the Y-axis direction, whereby a moving force toward the wire 20 is generated in the locking projection 70, so that the locking projection 70 can prevent the wire 20 from dropping off. Simultaneously, since the locking projection 70 is in contact with the wire 20, the first holding piece 52A can be prevented from being pressed outward in the Y-axis direction, so that a holding force of the chuck 50 for the held body 30 can be maintained. In the first exemplary embodiment as described above, the clip 40 can be suitably engaged with the wire 20 having a diameter as large as about 4 mm, which is larger than a diameter of a typical metallic wire (about 2 mm).

(3) The thickness T1 of the base portion 51 is defined to be smaller than the thickness T2 at the base end 56 of each of the first holding piece 52A and the second holding piece 52B.

This arrangement, which elastically deforms the base portion 51 having the small thickness T1, allows for an easy insertion of the held body 30 between the first holding piece 52A and the second holding piece 52B. Moreover, in the state where the wire 20 is engaged with the hook 60, even if the held body 30 is attempted to be drawn from between the first holding piece 52A and the second holding piece 52B, the locking projection 70 in pressure contact with the wire 20 can prevent the first holding piece 52A from being pressed outward.

(4) The thickness T2 at the base end 56 of each of the first holding piece 52A and the second holding piece 52B is defined to be larger than the thickness T1 of the base portion 51.

This arrangement allows for the easier elastic deformation of the base portion 51 than the base end 56 of each of the first holding piece 52A and the second holding piece 52B. Accordingly, the strength of the first holding piece 52A and the second holding piece 52B is improved to increase the holding force for the held body 30 and the base portion 51 is elastically deformed when the held body 30 is attempted to be drawn out of the chuck 50, so that a force for moving the locking projection 70 toward the wire 20 is generated to prevent the wire 20 from dropping off.

(5) Each of the first holding piece 52A and the second holding piece 52B is defined to have a larger thickness in the at-least-half region from the base end 56 in the Z-axis direction than the thickness in a region close to the leading end 63 with respect to the at-least-half region.

With this arrangement, the first holding piece 52A and the second holding piece 52B can provide an improved strength in a region close to the base end 56 while still providing elasticity, which is enough for the held body 30 to be insertable between the first holding piece 52A and the second holding piece 52B, in a region close to the leading end 55. Accordingly, the holding force of the chuck 50 for the held body 30 is improvable while the held body 30 is insertable between the first holding piece 52A and the second holding piece 52B.

(6) The thickness of each of the first holding piece 52A and the second holding piece 52B is gradually decreased from the base end 56 toward the leading end 55.

With this arrangement, the first holding piece 52A and the second holding piece 52B can provide an improved strength in a region close to the base end 56 while still having elasticity, which is enough for the held body 30 to be insertable between the first holding piece 52A and the second holding piece 52B. Further, the first holding piece 52A and the second holding piece 52B can be prevented from being locally elastically deformed.

Second Exemplary Embodiment

A second exemplary embodiment of the invention will be described below with reference to the attached drawings.

Figure 7:
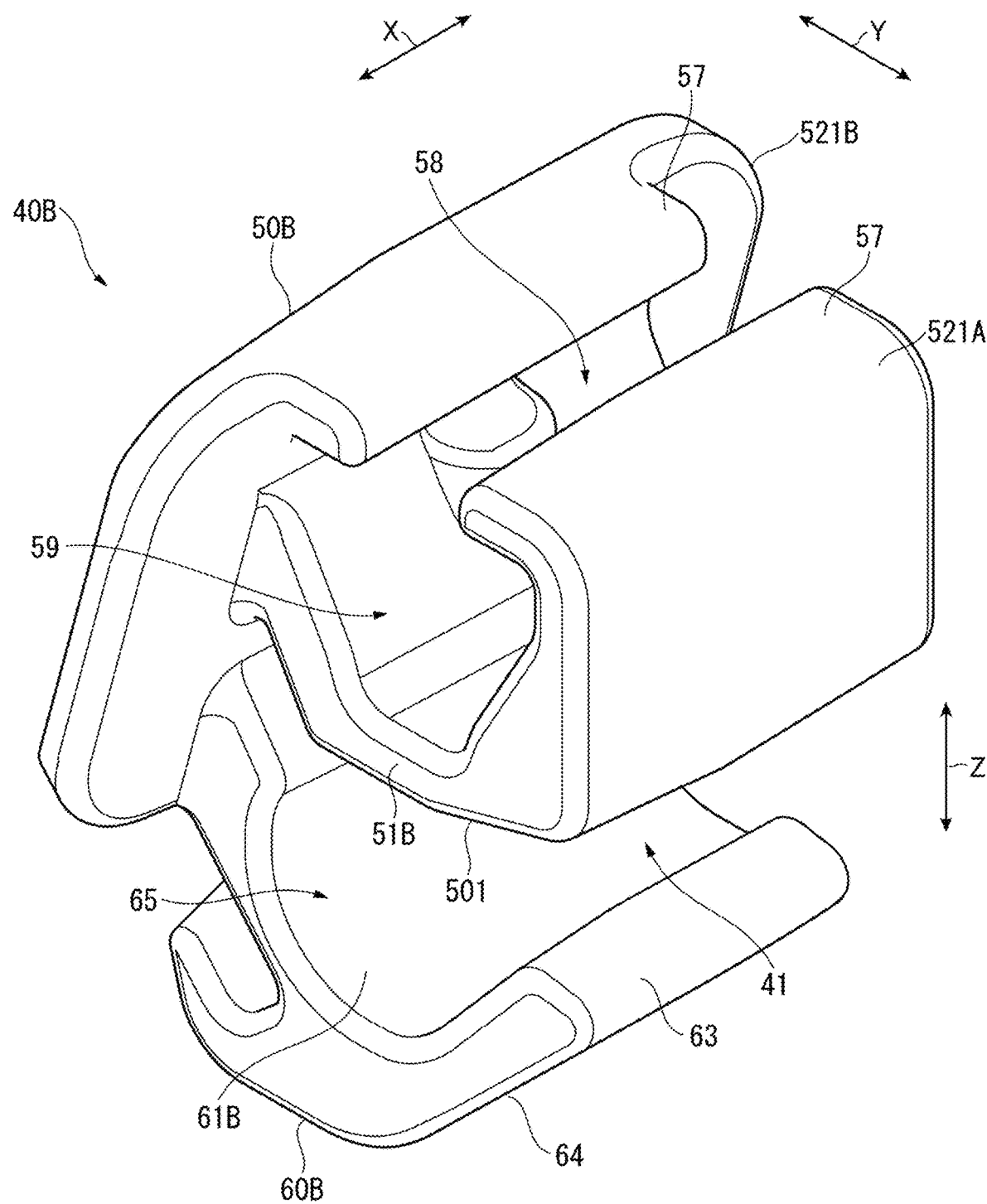
FIG. 7 is a perspective view of a clip in a cover-material fixing structure according to a second exemplary embodiment of the invention.
Figure 8:
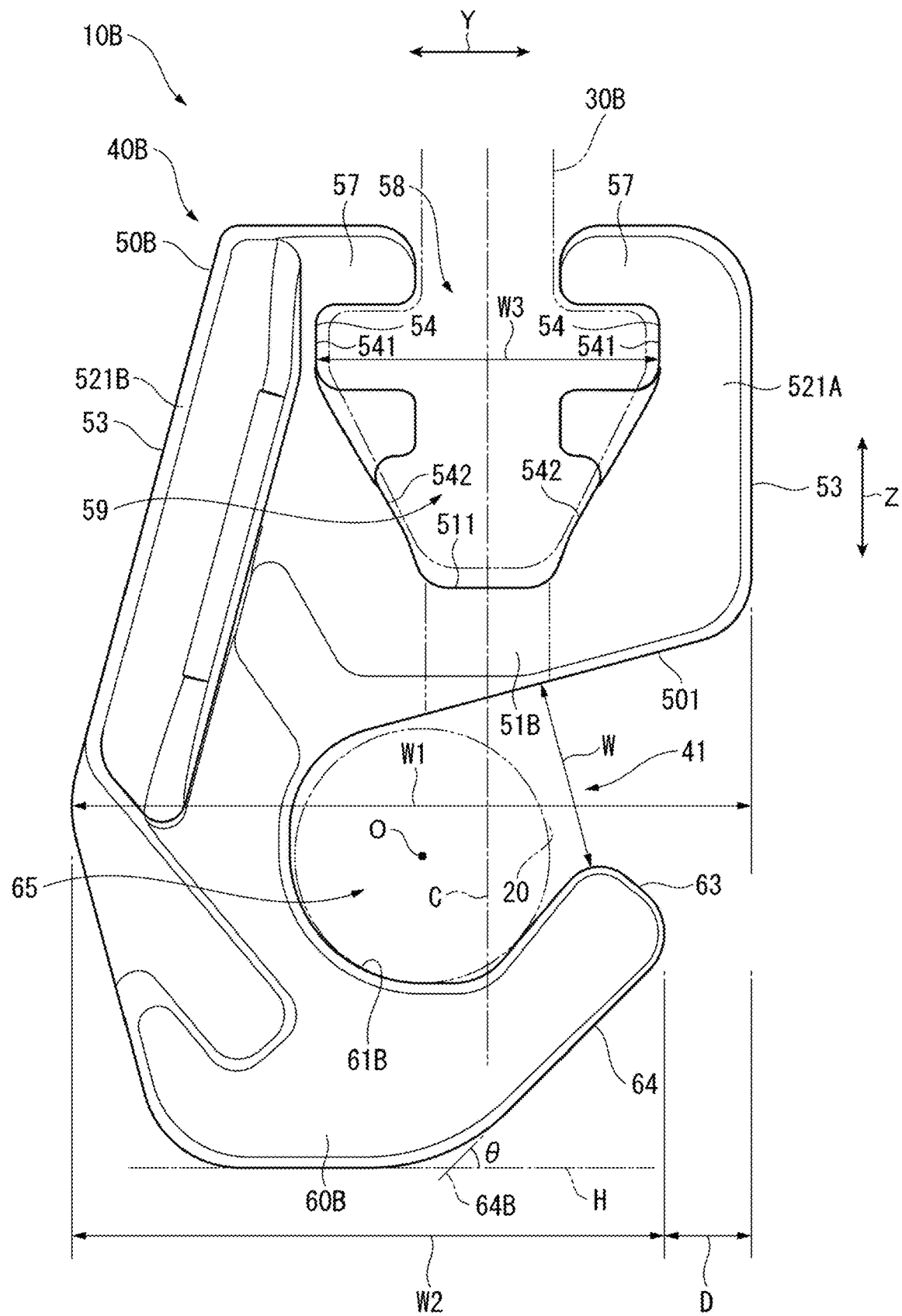
FIG. 8 is an end view of the clip in the cover-material fixing structure according to the second exemplary embodiment.

As shown in FIGS. 7 and 8, a cover-material fixing structure 10B according to the second exemplary embodiment includes the wire 20, the held body 30B, and a clip 40B (cover-material fixing clip). The wire 20 and the held body 30B are roughly the same as those in the first exemplary embodiment.

The clip 40B includes: a chuck 50B configured to hold the held body 30B; and an elastically deformable hook 60B configured to be engaged with the wire 20. The chuck 50B includes: a base portion 51B; and a first holding piece 521A and a second holding piece 521B extending from the base portion 51B upward in the Z-axis direction and facing each other in the Y-axis direction. The base portion 51B, the first holding piece 521A and the second holding piece 521B define the retention groove 59. The hook 60B extends downward from the later-described first holding piece 521A of the chuck 50B and is curved to define a groove formation surface 61B.

The base portion 51B has the bottom 511 continuous to the inner side surface 54 of each of the first holding piece 521A and the second holding piece 521B.

The first holding piece 521A and the second holding piece 521B are continuous to respective sides of the base portion 51B in the Y-axis direction. The inner side surface 54 of each of the first holding piece 521A and the second holding piece 521B includes the above-described inner surface 541 and the slant inner surface 542. The claws 57 are formed at the respective leading ends 55 of the first holding piece 521A and the second holding piece 521B to define the retention opening 58 therebetween. The thickness at the base end of each of the first holding piece 521A and the second holding piece 521B is set to be at least twice as large as the thickness of the base portion 51 in the Z-axis direction.

The chuck 50B has a wire-receiving surface 501 formed by the base portion 51B and the first holding piece 521A, in which the wire-receiving surface 501 is continuous to the groove formation surface 61B and the outer side surface 53 of the first holding piece 521A, and the wire-receiving surface 501 and the leading end 63 of the hook 60B define the engagement opening 41. The opening dimension W of the engagement opening 41 is set in a range from 50% to 80% of the width W3 of the retention groove 59, at 65% in the exemplary embodiment. The wire-receiving surface 501 is slanted from a side on the first holding piece 521A to a side on the second holding piece 521B with respect to the Y-axis direction so as to approach the leading end 63 of the hook 60B. The wire-receiving surface 501 is slanted upward to the right in FIG. 8.

The hook 60B is continuous to the second holding piece 521B. A width W2 of the hook 60B in the Y-axis direction is defined to be smaller than a maximum width W1 of the clip 40B in the Y-axis direction by a difference of a dimension D. The leading end 63 of the hook 60B is arranged close to the second holding piece 521B by the dimension D with respect to the outer side surface 53 of the first holding piece 521A in the Y-axis direction. The hook 60B has a guide surface 64 continuous to the leading end 63.

The guide surface 64 is slanted from a side close to the second holding piece 521B to a side close to the first holding piece 521A with respect to the Y-axis direction (an imaginary line H along the Y-axis direction) so as to approach the wire-receiving surface 501. An end (a contact point with the imaginary line H) of the guide surface 64, which is opposite from the leading end 63 of the hook 60B, is located close to the second holding piece 521B with respect to an imaginary line C along the Z-axis direction passing through a middle of the first holding piece 521A and the second holding piece 521B in the Y-axis direction.

An angle at which an imaginary slant line 64B along the guide surface 64 intersects with the imaginary line H is defined as an inclination angle θ. The inclination angle θ is set in a range from 20 degrees to 50 degrees in order to guide the wire 20 to the engagement opening 41, preferably from 25 degrees to 45 degrees, more preferably from 30 degrees to 40 degrees. In the exemplary embodiment, the inclination angle θ is set at 35 degrees.

Installation Procedure in Second Exemplary Embodiment

An installation procedure of the cover-material fixing structure 10B according to the second exemplary embodiment will be described below.

Figure 9:
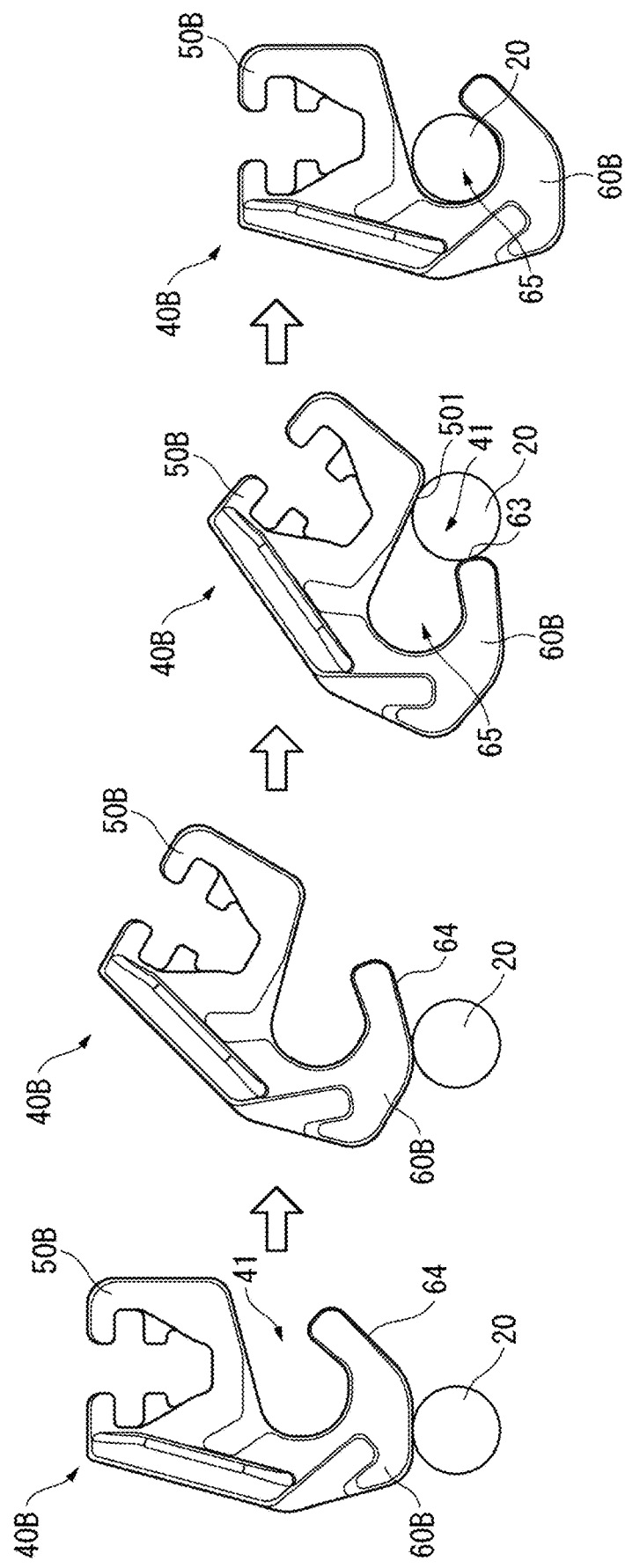
FIG. 9 explanatively shows an installation procedure of the clip of the cover-material fixing structure according to the second exemplary embodiment.

Firstly, the held body 30B is inserted into the retention opening 58 of the clip 40B to be placed in the retention groove 59 while being engaged with the claw 57 to be prevented from dropping off, in the same manner as in the first exemplary embodiment. Next, the clip 40B is inserted into the groove 2A of the cushion material 2 (see FIGS. 5 and 6) to engage the hook 60B with the wire 20. Specifically, the hook 60B will be engaged with the wire 20 as follows. As shown in FIG. 9, firstly, the clip 40B is inserted into the groove 2A, thereby bringing the hook 60B into contact with the wire 20. While the clip 40B is slanted with respect to the insertion direction, the wire 20 is guided along the guide surface 64 to the engagement opening 41. The thus guided wire 20 is brought into contact with the wire-receiving surface 501 and the leading end 63 of the hook 60B. The wire 20 is pushed into the engagement groove 65 with the hook 60B being elastically deformed, thereby being disposed in the engagement groove 65. The wire 20 is thus engaged with the hook 60B. In a state where the wire 20 is engaged with the hook 60B, an axis center O of the wire 20 is located close to the second holding piece 521B with respect to the imaginary line C in the Y-axis direction, as shown in FIG. 8. It should be noted that the illustration of the held body 30B is omitted in FIG. 9.

Advantages of Second Exemplary Embodiment (1) In the second exemplary embodiment, the opening dimension W of the engagement opening 41 is also set in a range from 50% to 80% of the width W3 of the retention groove 59 in the same manner as in the first exemplary embodiment. This arrangement can meet a demand of increasing the diameter of the wire 20 and provide a clicking feeling effect and a drop-prevention effect.

(2) Since the engagement opening 41 into which the wire 20 is inserted is defined between the wire-receiving surface 501 and the leading end 63 of the hook 60B, the wire 20 is to be inserted into the engagement opening 41 while the entire clip 40B is slanted with respect to the insertion direction (Z-axis direction) in which the clip 40B is inserted into the groove 2A of the cushion material 2. In the clip 40B, since the leading end 63 of the hook 60B is located close to the second holding piece 521B with respect to the outer side surface 53 of the first holding piece 521A, the clip 40B can receive the wire 20 on the wire-receiving surface 501 of the chuck 50B without being significantly slanted with respect to the insertion direction (Z-axis direction), whereby the wire 20 can be smoothly inserted into the engagement opening 41 between the leading end 63 of the hook 60B and the wire-receiving surface 501, and can be easily engaged with the hook 60B.

In the second exemplary embodiment, the wire 20 whose diameter is larger than a diameter of a space between the leading end 63 of the hook 60B and the wire-receiving surface 501 is engaged with the hook 60B. Even in this case, the wire 20 can be brought into contact with the leading end 63 of the hook 60B and the wire-receiving surface 501 to be easily inserted into the engagement opening 41 in the same manner as described above.

(3) The hook 60B has the guide surface 64 continuous to the leading end 63. The guide surface 64 is slanted from a side close to the second holding piece 521B to a side close to the first holding piece 521A with respect to the Y-axis direction so as to approach the wire-receiving surface 501.

With this arrangement, by inserting the clip 40B into the groove 2A of the cushion material 2 and sliding the clip 40B with the guide surface 64 being contact with the wire 20, the wire 20 can be guided toward the engagement opening 41 while the clip 40B is slanted.

(4) The hook 60B is continuous to the second holding piece 521B. With this arrangement, the engagement groove 65, which is formed by the groove formation surface 61B continuous to the wire-receiving surface 501, can be enlarged, so that the wire 20 having a larger diameter can be engaged with the hook 60B.

Moreover, the leading end 63 of the hook 60B can be located closer to the second holding piece 521B while the engagement groove 65 in a predetermined size is formed, so that an angle for slanting the clip 40B with respect to the insertion direction in order to engage the hook 60B with wire 20 can be made smaller.

(5) The end of the guide surface 64, which is opposite from the leading end 63 of the hook 60B, is located close to the second holding piece 521B with respect to the imaginary line C along the Z-axis direction passing through the middle of the first holding piece 521A and the second holding piece 521B in the Y-axis direction.

With this arrangement, for instance, compared with a case where the end of the hook 60B is close to the first holding piece 521A with respect to the imaginary line C, the guide surface 64 can be formed longer in a slant direction thereof.

Accordingly, even when the clip 40B is misaligned in the right-and-left direction (Y-axis direction) orthogonal to the insertion direction in which the clip 40B is inserted into the groove 2A of the cushion material 2, the guide surface 64 can be brought into contact with the wire 20 in a wide range.

(6) The wire-receiving surface 501 is slanted from a side on the first holding piece 521A to a side on the second holding piece 521B with respect to the Y-axis direction so as to approach the leading end 63 of the hook 60B.

With this arrangement, for instance, compared with a case where the wire-receiving surface 501 is formed along the Y-axis direction, a plane region where the clip 40B is projected on the wire 20 when the clip 40B is slanted with respect to the insertion direction can be made wide, so that the wire 20 can be stably received on this plane region.

Modification(s)

The clips 40 and 40B in the first and second exemplary embodiment are engaged with the wire 20 whose diameter is larger than the opening dimension W of the engagement opening 41. However, for instance, in some embodiments, the clips 40 and 40B are engaged with a wire having a diameter of about 2 mm, which is smaller than the opening dimension W.

Although the thickness T1 of the base portion 51 of the chuck 50 is defined to be smaller than the thickness T2 at the base end 56 of each of the first holding piece 52A and the second holding piece 52B in the first exemplary embodiment, the thickness T1 is equal to or larger than the thickness T2 in some embodiments. Although the thickness T2 is defined at least twice as large as the thickness T1, the thickness T2 may be less than twice as large as the thickness T1. It should be noted that the thickness T2 of the second exemplary embodiment may also be set in the same manner as the above.

Each of the first holding piece 52A and the second holding piece 52B in the at-least-half region from the base end 56 toward the leading end 55, which is defined to be larger than the thickness of each of the first holding piece 52A and the second holding piece 52B in a region close to the leading end 55 with respect to the at-least-half region in the first exemplary embodiment, may be designed otherwise For instance, the thickness of each of the first holding piece 52A and the second holding piece 52B may be larger in an at most half region from the base end 56 toward the leading end 55 than in a region close to the leading end 55 with respect to the at most half region. It should be noted that the thickness of each of the first holding piece 52A and the second holding piece 52B of the second exemplary embodiment may also be set in the same manner as the above.

The thickness of the region in the first holding piece 52A provided with the slant inner surface 542, which is gradually decreased from the base end 56 toward the leading end 55 of the first holding piece 52A in the first exemplary embodiment, may be formed constant.

The end of the guide surface 64 opposite the leading end 63 of the hook 60B, which is located close to the second holding piece 521B with respect to the imaginary line C along the Z-axis direction passing through the middle of the first holding piece 521A and the second holding piece 521B in the Y-axis direction in the second exemplary embodiment, may be located at any positions (e.g. on the imaginary line C or close to the first holding piece 521A with respect to the imaginary line C).

In the second exemplary embodiment, the wire-receiving surface 501 is slanted from a side on the first holding piece 521A to a side on the second holding piece 521B with respect to the Y-axis direction so as to approach the leading end 63 of the hook 60B. However, the wire-receiving surface 501 is not limited to this arrangement, but, for instance, extends in parallel to the Y-axis direction in some embodiments.

Figure 10:
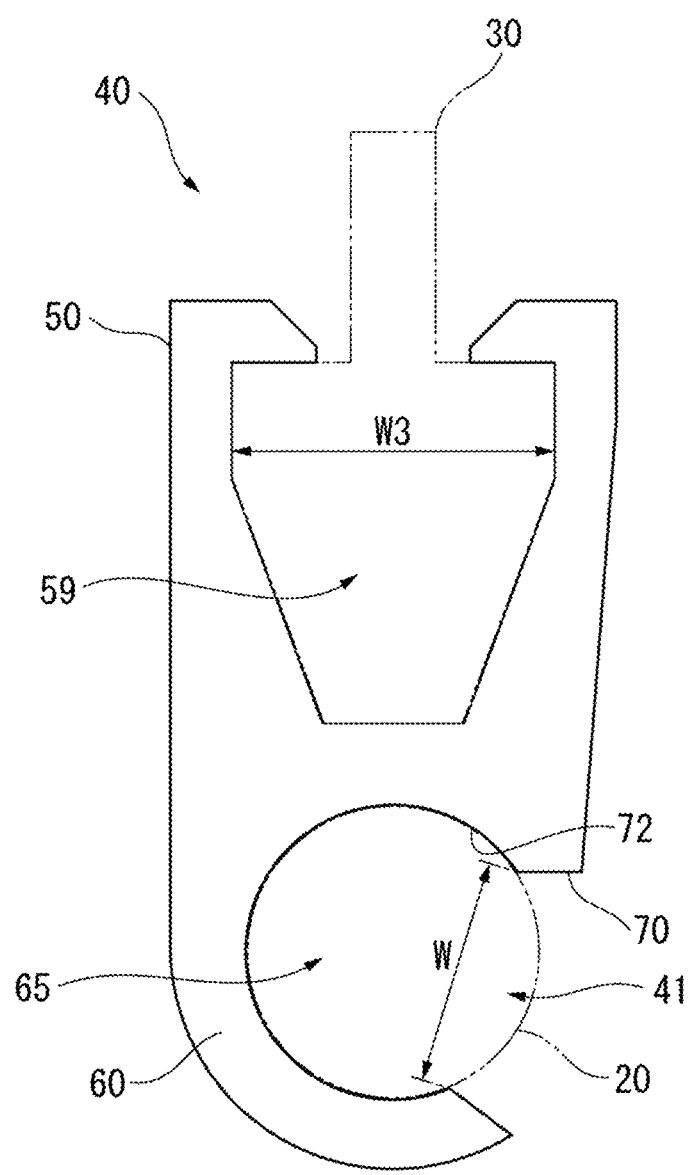
FIG. 10 is an end view of a clip in a first modification of the invention.
Figure 11:
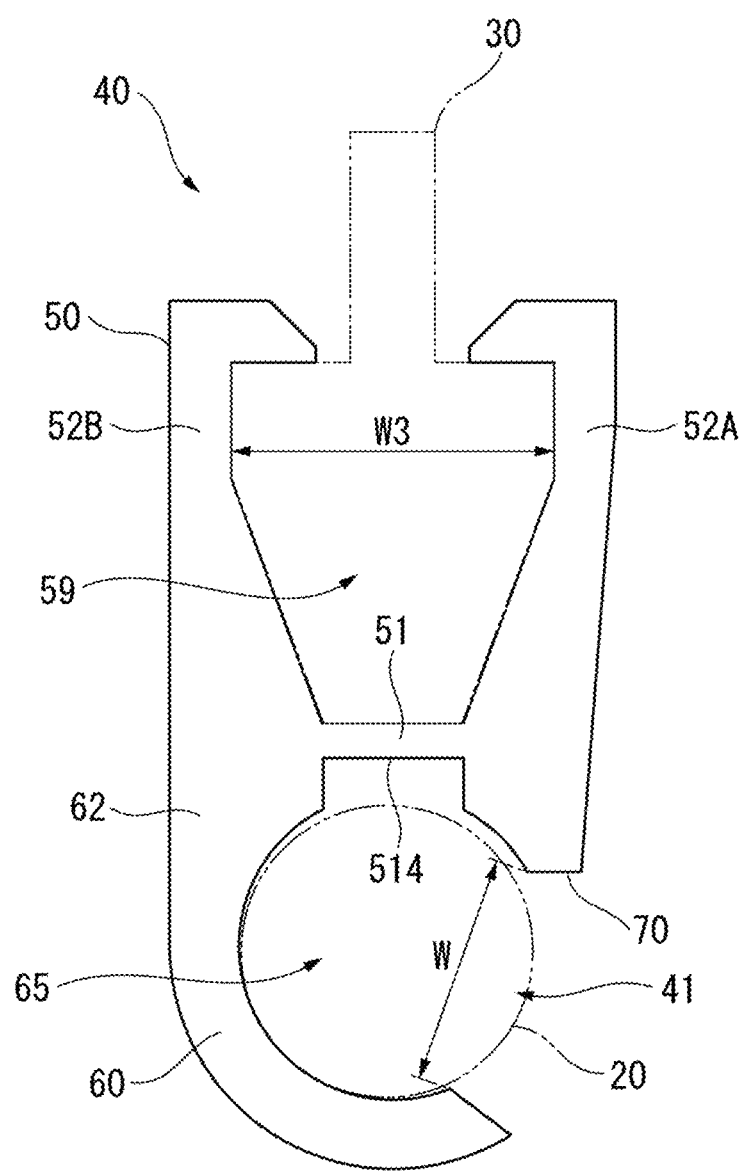
FIG. 11 is an end view of a clip in a second modification of the invention.

In the first exemplary embodiment, a space is formed between the locking projection 70 of the clip 40 and the wire 20 as shown in FIG. 3, so that the dimension L4 of the space between the locking projection 70 and the wire 20 is larger than zero. However, for instance, in some embodiments, the dimension L4 is zero by setting the diameters of the wire 20 and the engagement groove 65 to be equal as in a first modification shown in FIG. 10.

The base portion 51, which is provided with the arc surface 512 in the first exemplary embodiment, is not limited to this arrangement, but, for instance, in some embodiments, is provided with a concave portion 514 recessed toward the chuck 50 on a part of the base portion 51 between the base end 62 of the hook 60 and the locking projection 70.

This presence of the concave portion 514 decreases the thickness in the Z-axis direction of the part of the base portion 51 where the concave portion 514 is formed, so that the part is easily elastically deformed, and eventually the elastic deformation of the part allows the held body 30 to be easily inserted between the first holding piece 52A and the second holding piece 52B and allows the force for moving the locking projection 70 toward the wire 20 to be generated.

In the second exemplary embodiment, the entire wire-receiving surface 501 of the chuck 50B is slanted upward to the right as shown in FIG. 8. However, the wire-receiving surface is not limited to this arrangement. For instance, in some embodiments, a wire-receiving surface 502 is formed to be partially slanted upward to the right as in a third modification shown in FIG. 12.

Figure 12:
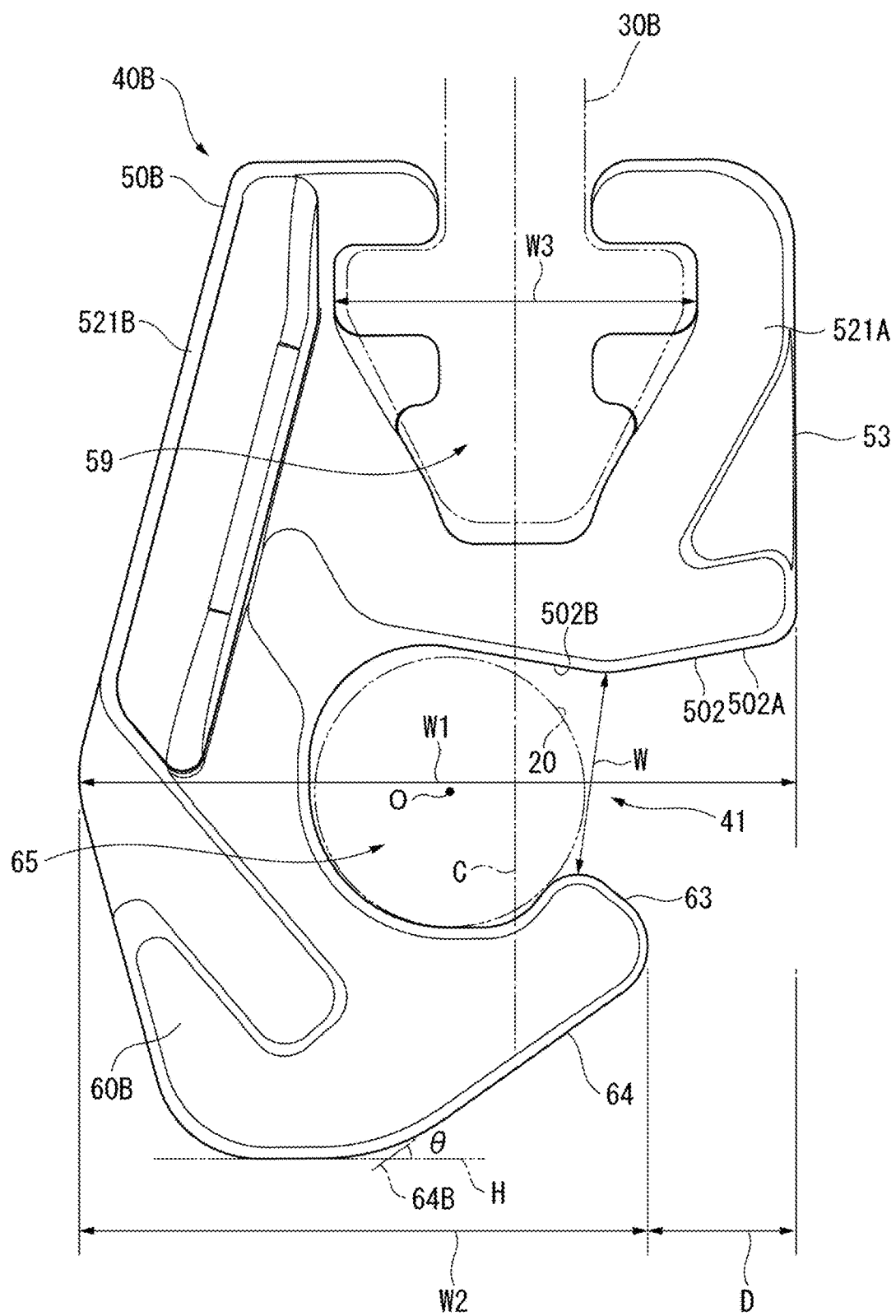
FIG. 12 is an end view of a clip in a third modification of the invention.

A part 502A of the wire-receiving surface 502, which is located close to the outer side surface 53 of the first holding piece 521A with respect to the leading end 63 of the hook 60B in the Y-axis direction, is slanted upward to the right in FIG. 12 from a side of the first holding piece 521A toward the second holding piece 521B with respect to the Y-axis direction so as to approach the leading end 63 of the hook 60B. In contrast, a part 502B of the wire-receiving surface 502, which is located close to the second holding piece 521B with respect to the leading end 63 of the hook 60B in the Y-axis direction, is slanted from a side of the second holding piece 521B toward the first holding piece 521A with respect to the Y-axis direction so as to approach the leading end 63 of the hook 60B. With this arrangement, the wire-receiving surface 502 has a bent shape.

Since the part 502B and the part 502A of the wire-receiving surface 502 are slanted in opposite directions as described above, the engagement groove 65 having a predetermined space corresponding to a large-diameter wire 20 can be formed without increasing a vertical dimension of the clip 40B.

Moreover, in the third modification, the end of the guide surface 64 opposite to the leading end 63 of the hook 60B is located significantly closer to the second holding piece 521B with respect to the imaginary line C than that in the second exemplary embodiment. Accordingly, the guide surface 64 is formed longer so that the wire 20 is easily brought into contact with the guide surface 64.

Figure 13:
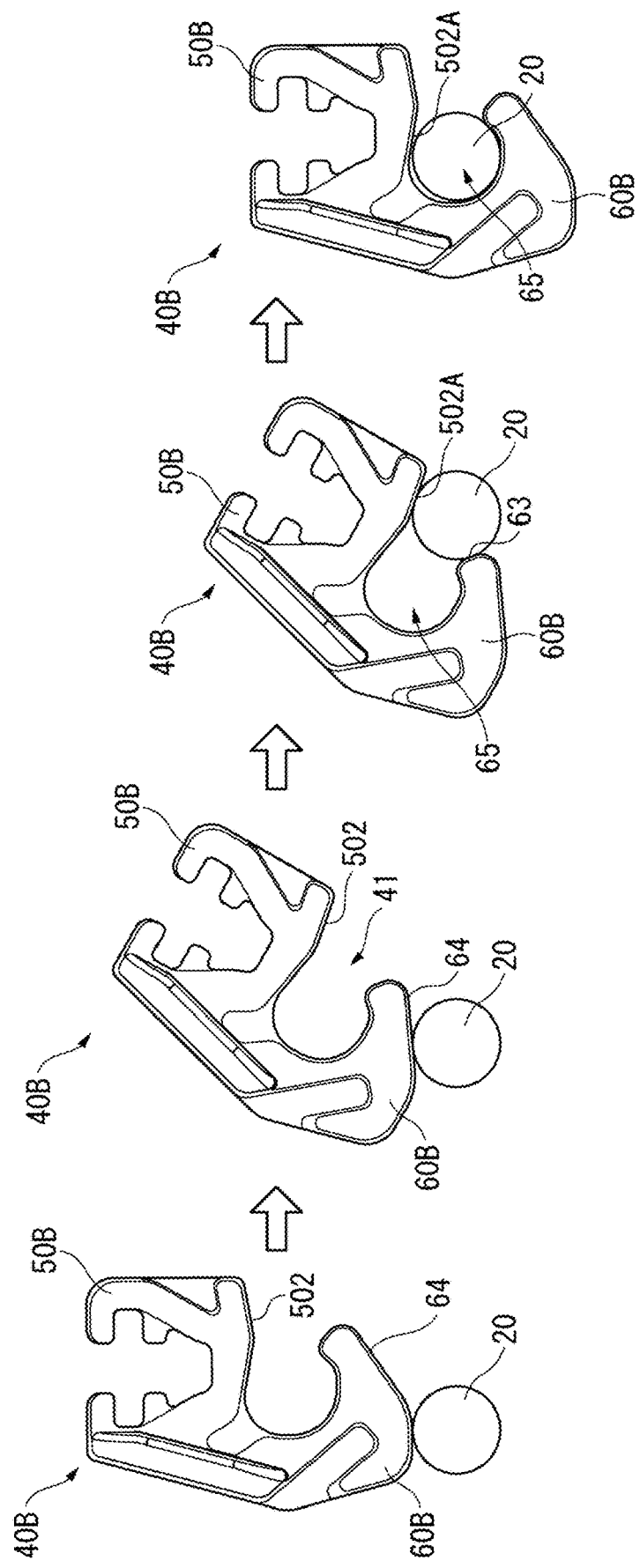
FIG. 13 explanatively shows an installation procedure of the clip in the third modification of the invention.

The clip 40B in the third modification is engaged with the wire 20 as shown in FIG. 13.

Firstly, the hook 60B is brought into contact with the wire 20, and the wire 20 is guided along the guide surface 64 to the engagement opening 41 while the clip 40B is slanted with respect to the insertion direction. The thus guided wire 20 is brought into contact with the part 502A of the wire-receiving surface 502 and the leading end 63 of the hook 60B. The wire 20 is pushed into the engagement groove 65 while the hook 60B is elastically deformed, thereby being received in the engagement groove 65. The hook 60B is thus engaged with the wire 20.

Figure 14:
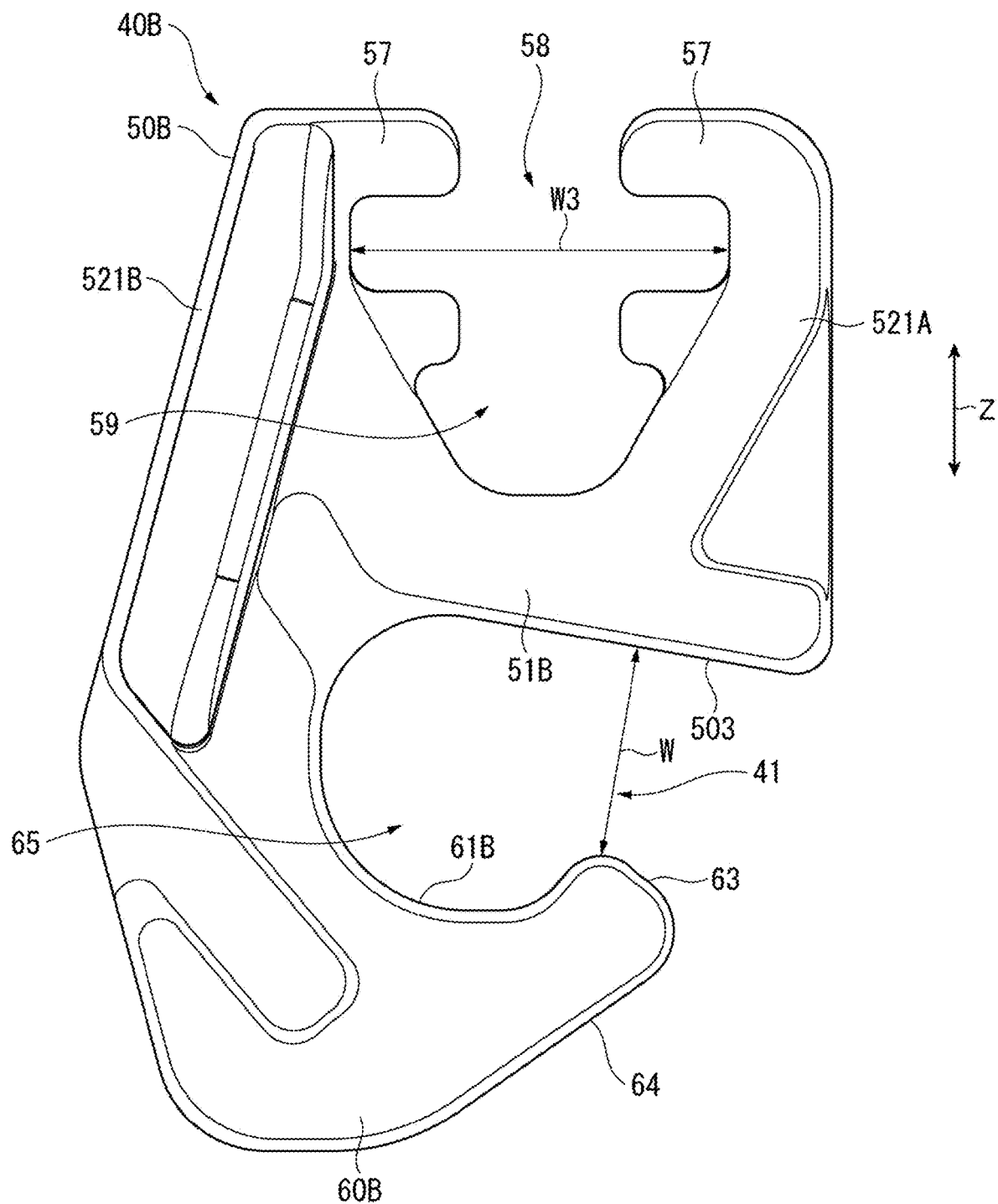
FIG. 14 is an end view of a clip in a fourth modification of the invention.

In the second exemplary embodiment, the entire wire-receiving surface 501 of the chuck 50B is slanted upward to the right as shown in FIG. 8. Moreover, in the third modification, the wire-receiving surface 502 is partially slanted upward to the right. However, the wire-receiving surface is not limited to these arrangements. For instance, in some embodiments, a wire-receiving surface 503 is formed to be slanted downward to the right as in a fourth modification shown in FIG. 14.

Figure 15:
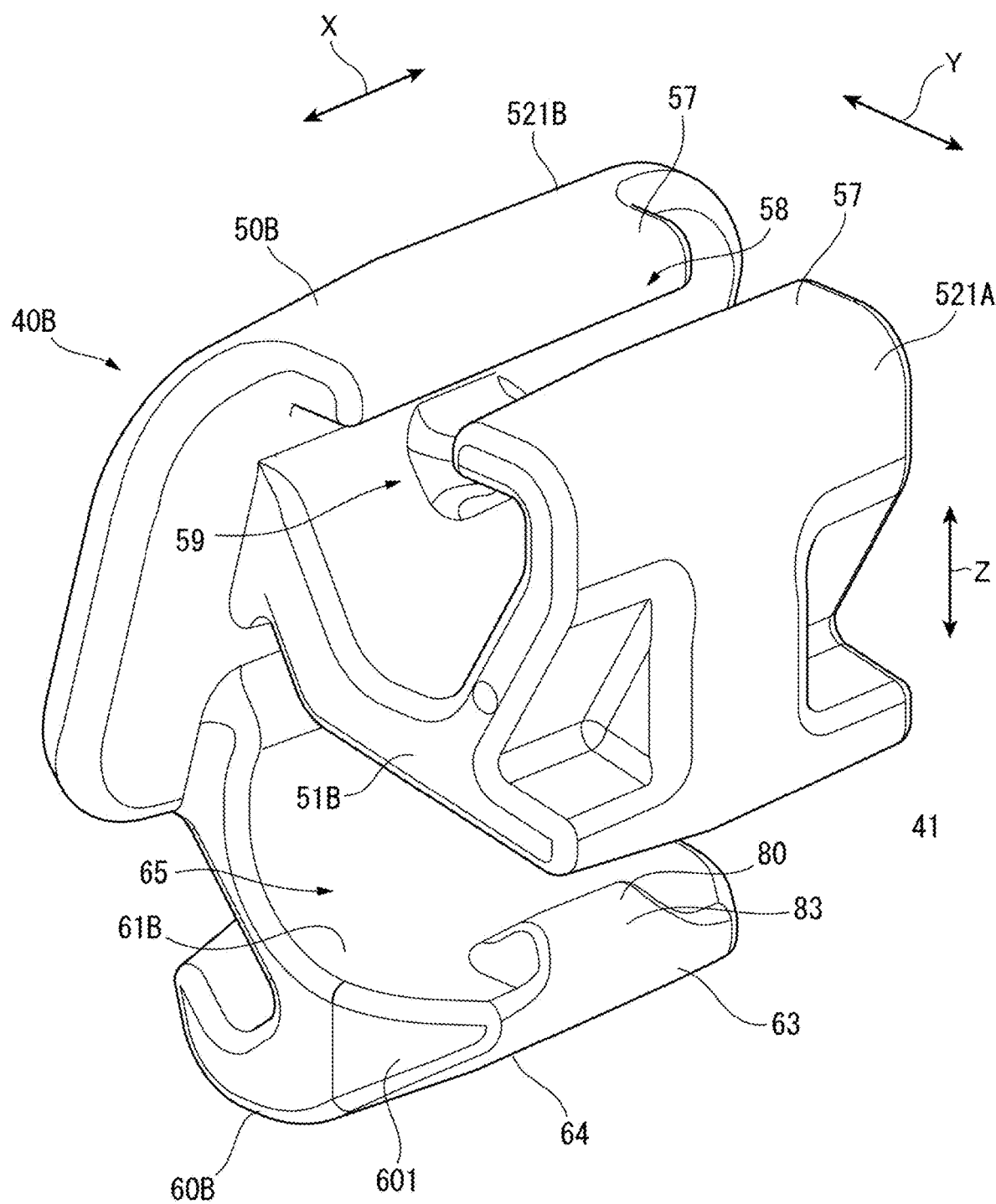
FIG. 15 is a perspective view of a clip in a fifth modification of the invention.
Figure 16:
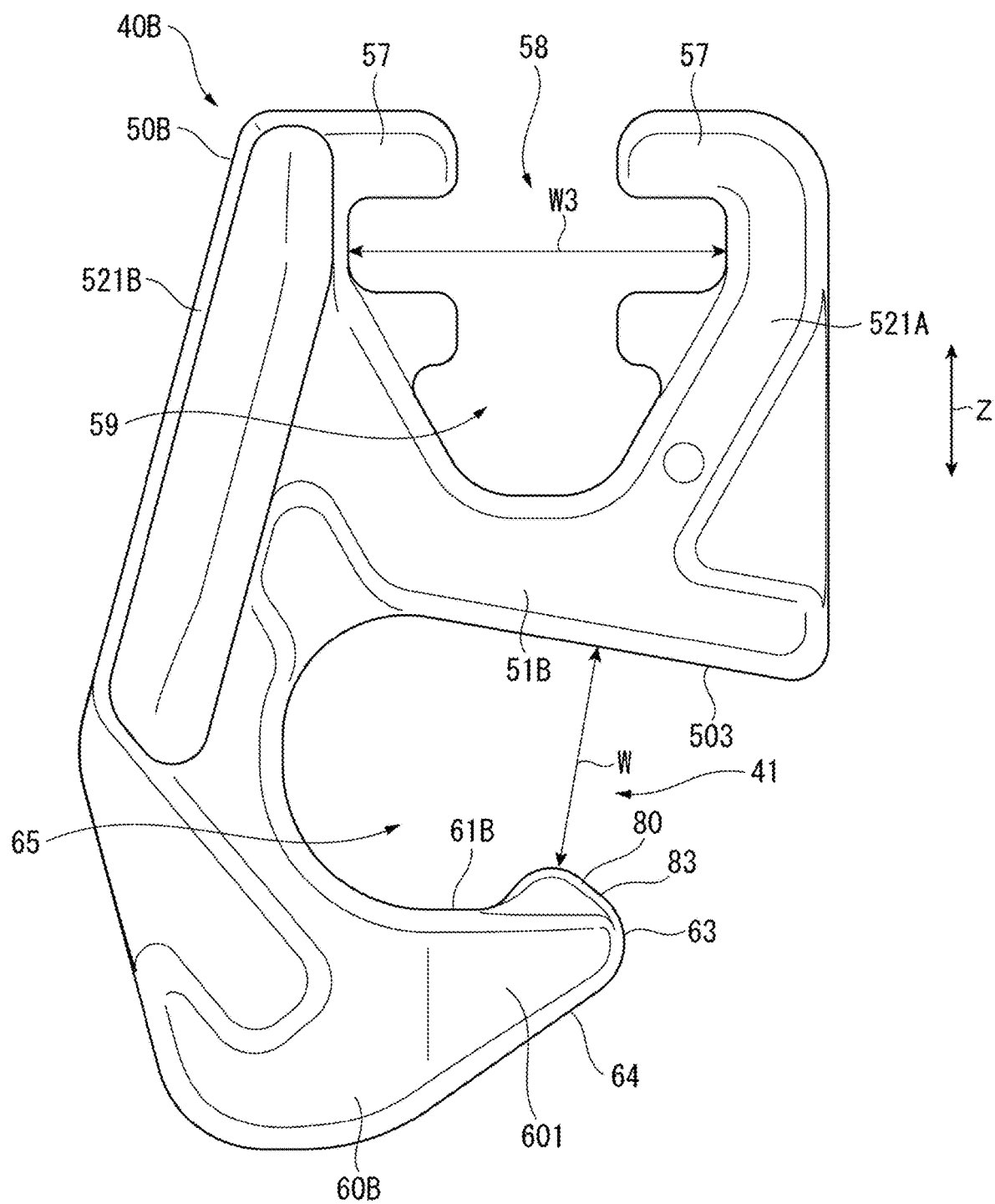
FIG. 16 is an end view of a clip in the fifth modification of the invention.
Figure 17:
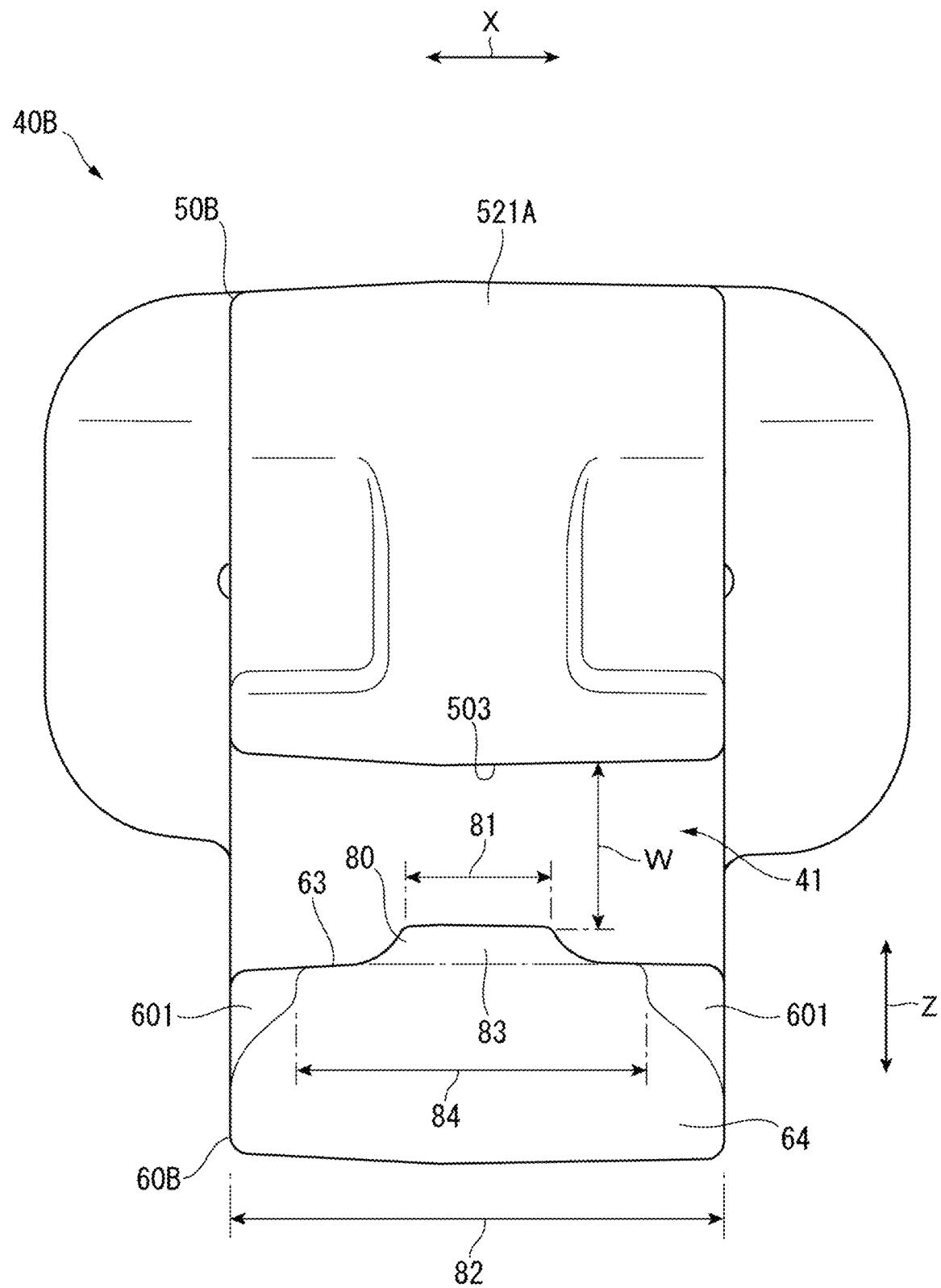
FIG. 17 is a lateral view of a clip in the fifth modification of the invention.

In the first and second exemplary embodiments and the first to fourth modifications, the leading end 63 of the hook 60, 60B is formed to have the maximum width in the X-axis direction of the hook 60, 60B. However, the leading end 63 is not limited to this arrangement. For instance, in some embodiments, a narrow projection 80 having a width 81 in the X-axis direction smaller than the maximum width 82 of the hook 60B in the X-axis direction is formed at the leading end 63 of the hook 60, 60B as in a fifth modification shown in FIGS. 15 to 17. FIGS. 15 to 17 show the narrow projection 80 formed on the clip 40B according to the fourth modification for convenience of explanation. The narrow projection 80 projects toward the base portion 51B of the chuck 50B. With this arrangement, when the wire 20 is inserted into the engagement opening 41 defined by the narrow projection 80 and the base portion 51B, a contact area of the clip 40B to be contacted with the wire 20 is reducible, so that the wire-insertion capability is improvable.

The width 81 of the narrow projection 80 in the X-axis direction is in a range from 18% to 70% of the maximum width 82 of the hook 60B, preferably 18% to 45%. With this arrangement, since the width 81 of the narrow projection 80 is not excessively small while the above-described wire-insertion capability is improvable, the wire 20 can be suitably prevented from dropping off.

Further, the narrow projection 80 is provided with an end guide face 83 that is slanted toward an outside of the engagement opening 41 so as to be away from the base portion 51B. With this arrangement, the wire 20 immediately before being inserted into the engagement opening 41 can be guided into the engagement opening 41 through the end guide face 83, so that the wire-insertion capability is improvable.

In addition, a taper surface 601, which tapers the hook 60B to the leading end 63, is formed at a part close to the leading end 63 of each of opposite sides of the hook 60B in the X-axis direction. An X-axis direction width between ends of the taper surface 601 is smaller than the maximum width 82 and larger than the width 81. With this arrangement, an insertion force of the wire 20 into the engagement opening 41 is reducible.

For instance, when the maximum width 82 of the hook 60B is defined at 8 mm and the opening dimension W of the engagement opening 41 is defined at 3.1 mm, the width of the narrow projection 80 may be 3 mm and the X-axis direction width between the ends of the taper surface 601 may be 5.5 mm. The width of the narrow projection 80 may be set in a range from 1.5 mm to 5.5 mm. When the width of the narrow projection 80 is set at 5.5 mm, the width of the narrow projection 80 is equal to the X-axis direction width between the ends of the taper surface 601.

When the narrow projection 80 is formed at the leading end 63 of the hook 60B as described above, a narrow rib may be formed on the base portion 51B and a surface of the rib facing the hook 60B may be a wire-receiving surface. The narrow projection 80 may be further formed on the wire-receiving surface. A projecting end of the narrow projection 80 may be pointed.

Alternatively, the narrow projection 80 may be formed on the base portion 51B in place of or in addition to the leading end 63 of the hook 60B. In this case, the width 81 of the narrow projection 80 is set to be smaller than the maximum width 82 of the base portion 51B and may be in a range from 18% to 70%, preferably from 18% to 45% of the maximum width 82 as described above. Alternatively, when the narrow projection 80 is formed on each of the leading end 63 of the hook 60B and the base portion 51B, the narrow projections 80 on both of the hook 60B and the base portion 51B may be set at about 25% of the maximum width 82 of the hook 60B and the base portion 51B and/or may be offset at different positions in the X-axis direction. Further, the above-described narrow projections 80 may have pointed projecting ends.

The clip 40B according to the fourth modification provided with the narrow projection 80 is described as the fifth modification as shown in FIGS. 15 and 16 for convenience of explanation. However, the narrow projection 80 may be formed to any clips, for instance, according to the first and second exemplary embodiments and the first to third modifications. In the clip 40 according to the first exemplary embodiment and the first and second modifications, the narrow projection 80 may be formed by decreasing the width 84 in the X-axis direction of the locking projection 70 and/or changing a shape thereof.

These arrangements can also offer the same operations and effects as those described above.

A hollow portion, which is formed as needed in the clip 40B of the second exemplary embodiment and the third and fourth modifications, may be omitted.

The vertical dimension of the engagement groove 65 in the Z-axis direction is set to be slightly larger than the diameter of the wire 20 as shown in FIG. 8 in the second exemplary embodiment, but not limited thereto. For instance, in some embodiments, the vertical dimension of the engagement groove 65 is larger approximately by a dimension C1 than the diameter R of the wire 20 (a predetermined diameter of the wire 20 to be engaged with the engagement groove 65) as shown in the sixth modification in FIGS. 18 to 20. Here, the dimension C1 is about 25% of the maximum length of the engagement groove 65 in the Z-axis direction. Moreover, a wire-receiving surface 504 of the clip 40B according to the sixth modification is formed in parallel to the Y-axis direction.

For instance, when a wire having the diameter R of about 4 mm is used as the wire 20 to be engaged, if the vertical dimension of the engagement groove 65 is small, an urethane foam possibly remaining on a circumferential surface of the wire 20 may be brought into contact with the groove formation surface 61B and the wire-receiving surface 504 (see FIG. 19) and enlarges the engagement groove 65 to increase the opening dimension W, which may cause the wire 20 to drop off. However, in the sixth modification, since the vertical dimension of the engagement groove 65 is large as described above, even if the urethane foam remains on the circumferential surface of the wire 20, a space 651 is ensured between the wire 20 and the wire-receiving surface 504 (see FIG. 19). This space can prevent the engagement groove 65 from being enlarged by, for instance, the urethane foam remaining on the circumferential surface of the wire 20 to increase the opening dimension W, thereby firmly maintaining the engagement state of the wire 20.

Figure 20:
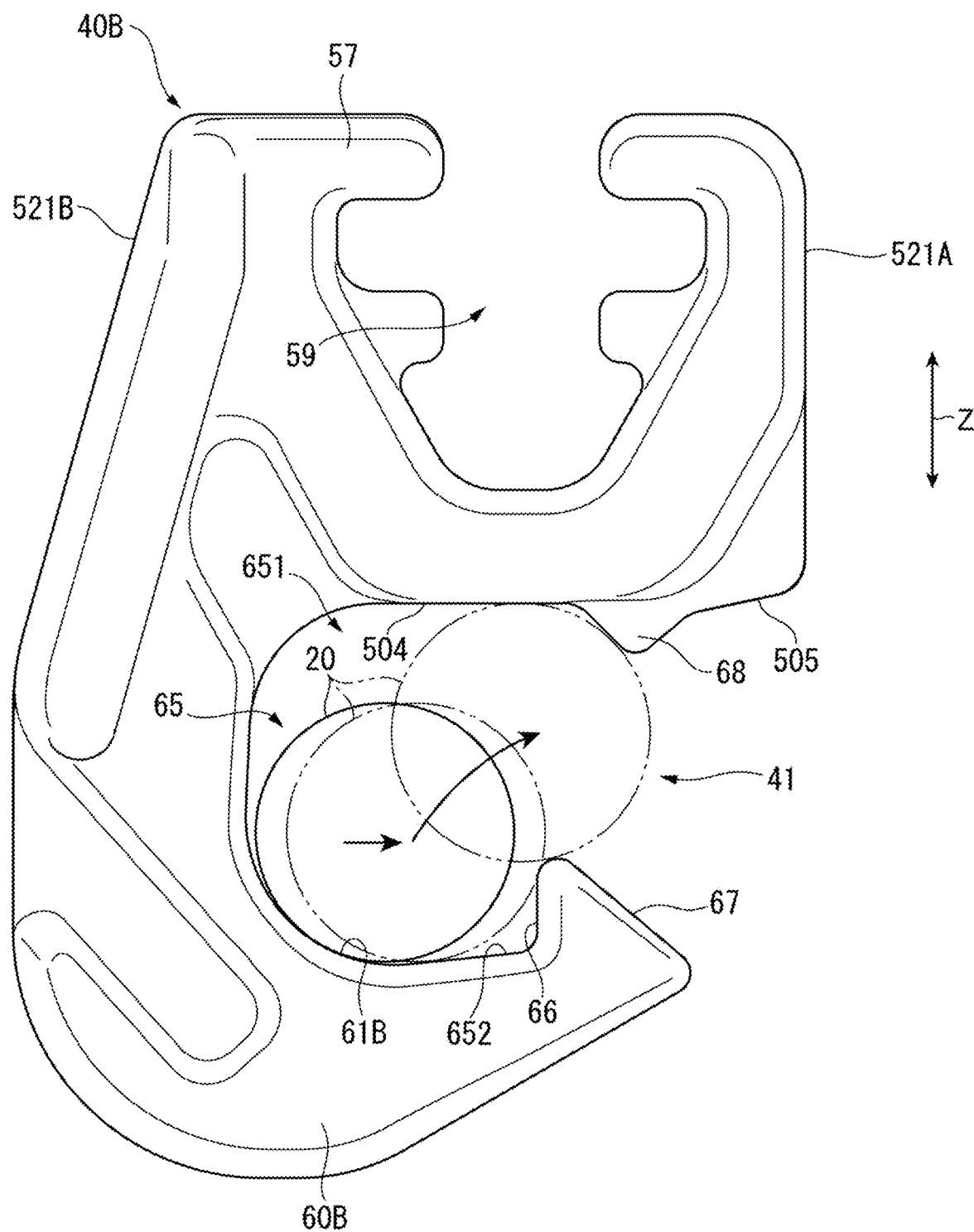
FIG. 20 explanatively shows the clip in the sixth modification of the invention.

The clip 40B according to the sixth modification has a retention barb surface 66 formed at the leading end 63 of the hook 60B. The retention barb surface 66, which is continuous to the groove formation surface 61B of the engagement groove 65, projects from the engagement groove 65 toward the retention groove 59 in the Z-axis direction. With this arrangement, even when the wire 20 is moved in the Y-axis direction toward the engagement opening 41, the wire 20 is prevented from dropping off by being brought into contact with the retention barb surface 66 as shown in FIG. 20.

An insertion guide surface 67 that is slanted with respect to the Y-axis direction is formed to the retention barb surface 66 and the guide surface 64. A width of the insertion guide surface 67 (a dimension between the retention barb surface 66 and the guide surface 64) is set at about 2 mm as long as possible, whereby the wire 20 is easily guided into the engagement opening 41.

A part of the groove formation surface 61B continuous to the retention barb surface 66 is defined as a slant surface 652 that is slightly slanted upward with respect to the Y-axis direction from a side of the second holding piece 521B toward the first holding piece 521A. This presence of the slant surface 652 allows for a large length at an innermost part of the engagement groove 65 in the Z-axis direction, and allows the wire 20 inserted in the engagement groove 65 to be guided to the innermost part by the slant surface 652 and sufficiently obtain the dimension C1. Moreover, since the presence of the slant surface 652 makes it difficult for the wire 20 to move toward the retention barb surface 66, the force of holding the wire 20 is improvable.

Figure 18:
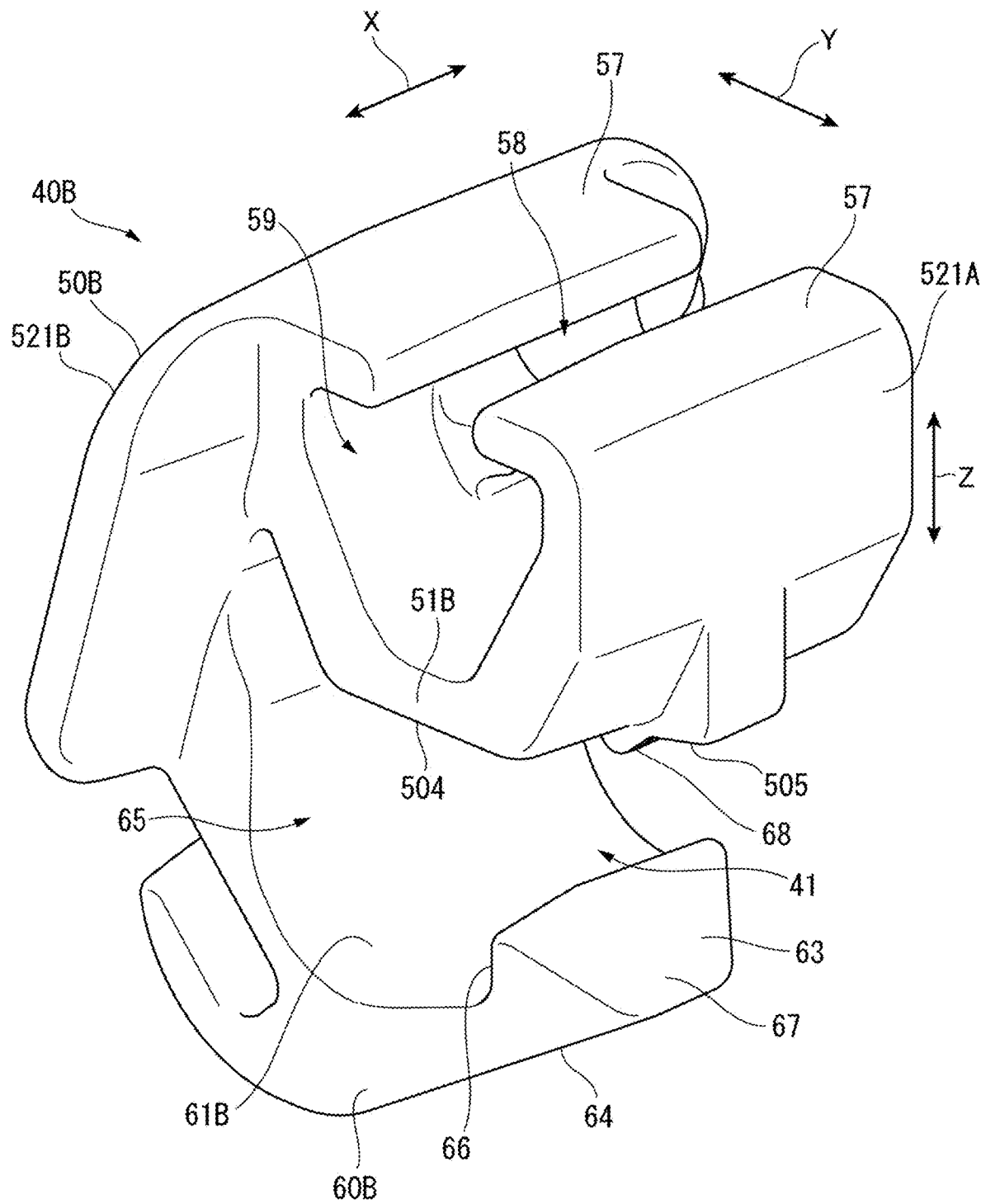
FIG. 18 is a perspective view of a clip in a sixth modification of the invention.

The clip 40B according to the sixth modification has a retention projection 68 projecting downward from the wire-receiving surface 504. In the sixth modification, the opening dimension W of the engagement opening 41 is defined as a dimension between an end of the retention projection 68 and a continuous part of the retention barb surface 66 and the insertion guide surface 67. As shown in FIG. 18, the retention projection 68 has a smaller width than a width of the wire-receiving surface 504 in the X-axis direction and is formed substantially in the middle of the wire-receiving surface 504 in the X-axis direction. By thus forming the retention projection 68 with a narrow width, the insertability of the wire 20 is enhanced as compared with a case where the retention projection 68 is formed over the entire wire-receiving surface 504. In addition, a click feeling can be produced when the wire 20 is completely inserted into the engagement groove 65 from the engagement opening 41, so that the completion of the insertion can be easily recognized even if the insertion of the wire 20 cannot be visually observed. A continuous surface from the retention projection 68 to the first holding piece 521A is defined as a slant guide surface 505 that is slanted upward with respect to the Y-axis direction from a side of the second holding piece 521B toward the first holding piece 521A. An angle at which the imaginarily extended slant guide surface 505 and insertion guide surface 67 intersect with each other is made as large as possible, for instance, about 52 degrees, thereby facilitating guiding the wire 20 into the engagement opening 41.

The retention projection 68 (especially, a tip thereof) is located close to the first holding piece 521A (outside of the engagement opening 41) by a difference D1 with respect to the retention barb surface 66 in the Y-axis direction. The difference D1 is, for instance, about from 0.7 mm to 1.4 mm. Accordingly, as shown in FIG. 20, even if the wire 2 in contact with the retention barb surface 66 is further moved over the retention barb surface 66 so as to be out of the engagement opening 41, the wire 20 is prevented from dropping off by the retention projection 68 in contact with the wire 20. Since the first dropping-off prevention with the retention barb surface 66 and the second dropping-off prevention with the retention projection 68 can be conducted, the wire 20 can be more effectively prevented from dropping off.

Figure 19:
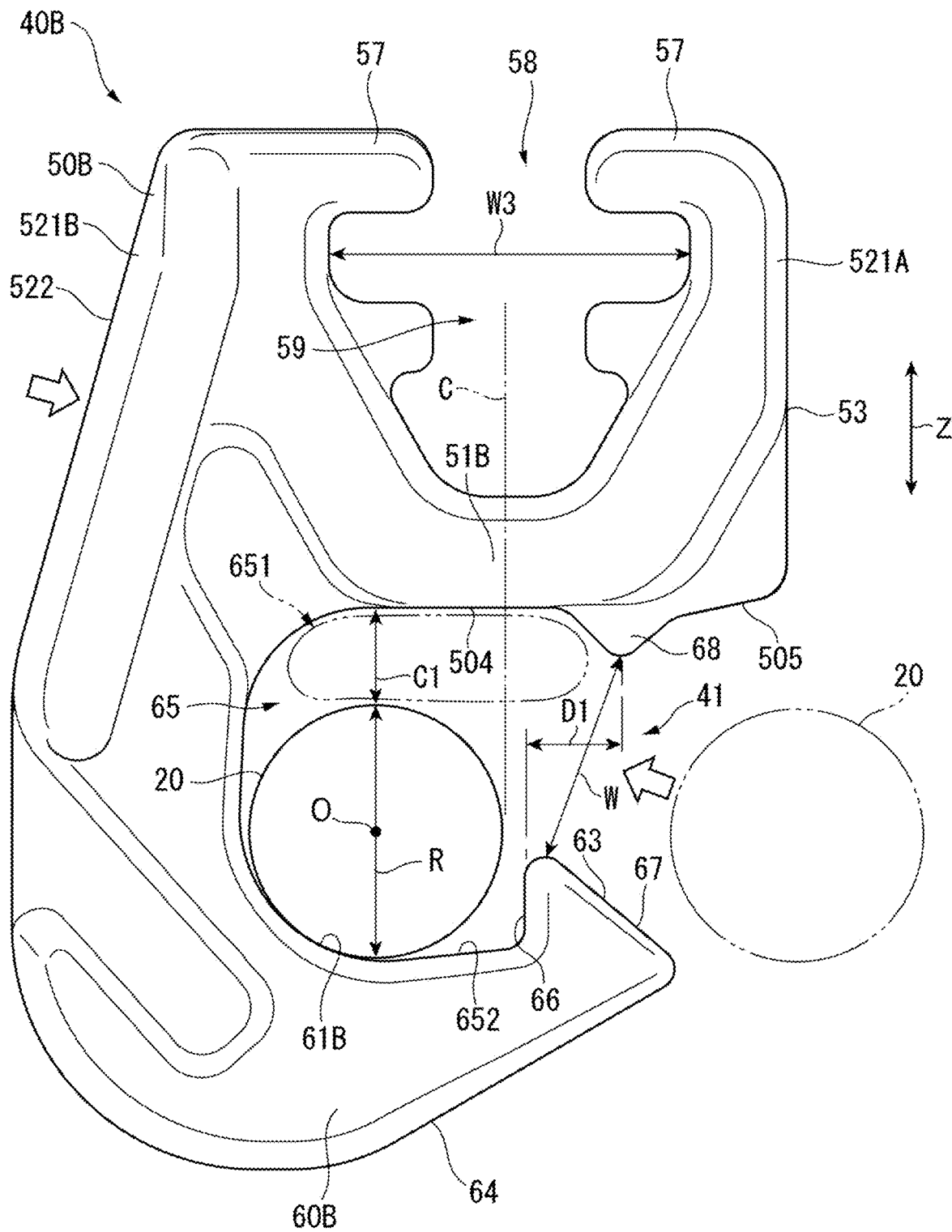
FIG. 19 is an end view of the clip in the sixth modification of the invention.

Moreover, the second holding piece 521B has an outer side surface 522 that is slanted downward to the left with respect to the Z-axis direction as shown in FIG. 19. Meanwhile, the retention projection 68 is located outside (the right side in FIG. 19) of the engagement opening 41 by the difference D1 with respect to the retention barb surface 66 as described above. Accordingly, the direction in which the wire 20 is pushed into the engagement opening is diagonally upward to the left as shown in FIG. 19, whereas the outer side surface 522 of the second holding piece 521B can be pressed diagonally downward to the right, so that the wire 20 can be easily inserted into the engagement groove 65.

In the clip 40 of the first exemplary embodiment, the dimensions L1 to L4 are set as described above to satisfy the relationship of the formula (1) for reference of the invention. However, the clip may have the dimensions set out of the relationship. Even with this clip, while the held body 30 is unlikely to drop off from the retention groove 59 since the thickness of each of the first holding piece 52A and the second holding piece 52B is large, the base portion 51 is easily elastically deformed due to the small thickness thereof to bring the locking projection 70 into contact with the wire 20, so that the wire 20 can be prevented from dropping off.

The invention claimed is:

1. A cover-material fixing clip comprising:
a chuck provided with a retention groove for holding a held body attached to a cover material;
a hook configured to be engaged with a wire to be located in a groove of a cushion material; and
an engagement opening defined between the chuck and a leading end of the hook,
the engagement opening having an opening dimension in a range from 50% to 80% of a width of the retention groove,
wherein
the chuck comprises: a base portion; a first holding piece and a second holding piece extending from the base portion in a first direction; and a locking projection projecting toward the leading end of the hook,
the first holding piece and the second holding piece respectively comprise claws projecting to approach each other in a second direction intersecting with the first direction,
the hook comprises a base end continuous to the second holding piece of the chuck,
the locking projection is continuous to the first holding piece of the chuck, and
provided that a dimension of each of the claws in the second direction is a dimension L1, a dimension from each of the claws to the base portion in the first direction is a dimension L2, a dimension of the base portion and the locking projection in combination in the first direction is a dimension L3, and a dimension of a space between the wire being engaged with the hook and the locking projection is a dimension L4, the dimension L1, the dimension L2 and the dimension L3 are set so that a dimension obtained by dividing the dimension L2 with the dimension L3 and multiplying the obtained value with the dimension L1 is set to be larger than the dimension L4.

2. The cover-material fixing clip according to claim 1, wherein
a thickness of the base portion is smaller than a thickness at a base end of each of the first holding piece and the second holding piece.

3. The cover-material fixing clip according to claim 1, wherein
the base end of the hook is spaced from the locking projection in the second direction, and
the base portion comprises a concave portion that is recessed toward the chuck at a part of the base portion between the base end of the hook and the locking projection.

4. The cover-material fixing clip according to claim 1, wherein
a thickness at a base end of each of the first holding piece and the second holding piece is larger than a thickness of the base portion.

5. The cover-material fixing clip according to claim 1, wherein
a thickness of each of the first holding piece and the second holding piece is larger in an at least half region from a base end of each of the first holding piece and the second holding piece in the first direction than in a region close to a leading end of each of the first holding piece and the second holding piece with respect to the at least half region.

6. The cover-material fixing clip according to claim 1, wherein
a thickness of each of the first holding piece and the second holding piece is gradually decreased from the base end toward a leading end of each of the first holding piece and the second holding piece.

7. A cover-material fixing clip, comprising:
a chuck provided with a retention groove for holding a held body attached to a cover material;
a hook configured to be engaged with a wire to be located in a groove of a cushion material; and
an engagement opening defined between the chuck and a leading end of the hook, the engagement opening having an opening dimension in a range from 50% to 80% of a width of the retention groove;
wherein
the chuck comprises: a base portion; and a first holding piece and a second holding piece extending from the base portion in a first direction and facing each other in a second direction intersecting with the first direction,
at least one of the leading end of the hook or the chuck comprises a narrow projection projecting towards the other of the leading end and the chuck and defining the engagement opening,
a width of the narrow projection in a third direction intersecting with the first direction and the second direction is smaller than a width of at least one of the hook or the chuck in the third direction, and
a taper surface tapering the hook to the leading end is formed at a part close to the leading end of each of opposite sides of the hook.

* * * * *